(12) United States Patent
Reimer et al.

(10) Patent No.: US 10,945,131 B2
(45) Date of Patent: Mar. 9, 2021

(54) METHODS AND APPARATUS FOR SECURELY STORING, USING AND/OR UPDATING CREDENTIALS USING A NETWORK DEVICE AT A CUSTOMER PREMISES

(71) Applicant: Charter Communications Operating, LLC, St. Louis, MO (US)

(72) Inventors: Mark Reimer, Denver, CO (US); Douglas Melroy, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 120 days.

(21) Appl. No.: 16/217,023

(22) Filed: Dec. 11, 2018

(65) Prior Publication Data
US 2020/0187004 A1    Jun. 11, 2020

(51) Int. Cl.
| | |
|---|---|
| *H04M 1/66* | (2006.01) |
| *H04W 12/06* | (2021.01) |
| *H04W 12/08* | (2021.01) |
| *G06F 21/45* | (2013.01) |
| *G06F 21/60* | (2013.01) |
| *H04L 29/06* | (2006.01) |
| *G06F 21/78* | (2013.01) |
| *H04W 12/104* | (2021.01) |

(52) U.S. Cl.
CPC ......... *H04W 12/068* (2021.01); *G06F 21/45* (2013.01); *G06F 21/602* (2013.01); *G06F 21/78* (2013.01); *H04L 63/083* (2013.01); *H04L 63/0853* (2013.01); *H04W 12/08* (2013.01); *H04W 12/104* (2021.01); *G06F 2221/2117* (2013.01)

(58) Field of Classification Search
CPC ............ H04W 12/06; H04W 12/0602; H04W 12/0605; H04W 12/0608; H04L 63/0428; H04L 63/0853; H04L 9/0861
See application file for complete search history.

(56) References Cited

U.S. PATENT DOCUMENTS

| | | | | |
|---|---|---|---|---|
| 2011/0016307 | A1* | 1/2011 | Killian ................. | H04L 9/3213 713/151 |
| 2013/0091279 | A1* | 4/2013 | Haddad ................ | H04W 12/06 709/225 |
| 2013/0305329 | A1* | 11/2013 | Zhang .............. | G06K 19/06028 726/6 |
| 2014/0029749 | A1* | 1/2014 | Malasani ............... | H04L 63/20 380/270 |
| 2015/0089600 | A1* | 3/2015 | Fan ....................... | H04W 12/04 726/4 |
| 2015/0143486 | A1* | 5/2015 | Hartmann ......... | H04W 12/0608 726/6 |
| 2015/0326610 | A1* | 11/2015 | Bartoszewski ..... | H04L 63/0263 726/1 |
| 2016/0028705 | A1* | 1/2016 | Kawano ................ | H04L 67/141 726/4 |
| 2018/0263071 | A1* | 9/2018 | Yoon ................... | H04W 12/003 |

\* cited by examiner

*Primary Examiner* — Shantell L Heiber
(74) *Attorney, Agent, or Firm* — Straub & Straub; Michael P. Straub; Stephen T. Straub

(57) ABSTRACT

Methods and apparatus for securely storing, using and/or updating credential information, e.g., passwords and user IDs for a user who subscribes to one or more services, e.g., video stream services or other services available through a communications network such as the Internet, are described.

16 Claims, 15 Drawing Sheets

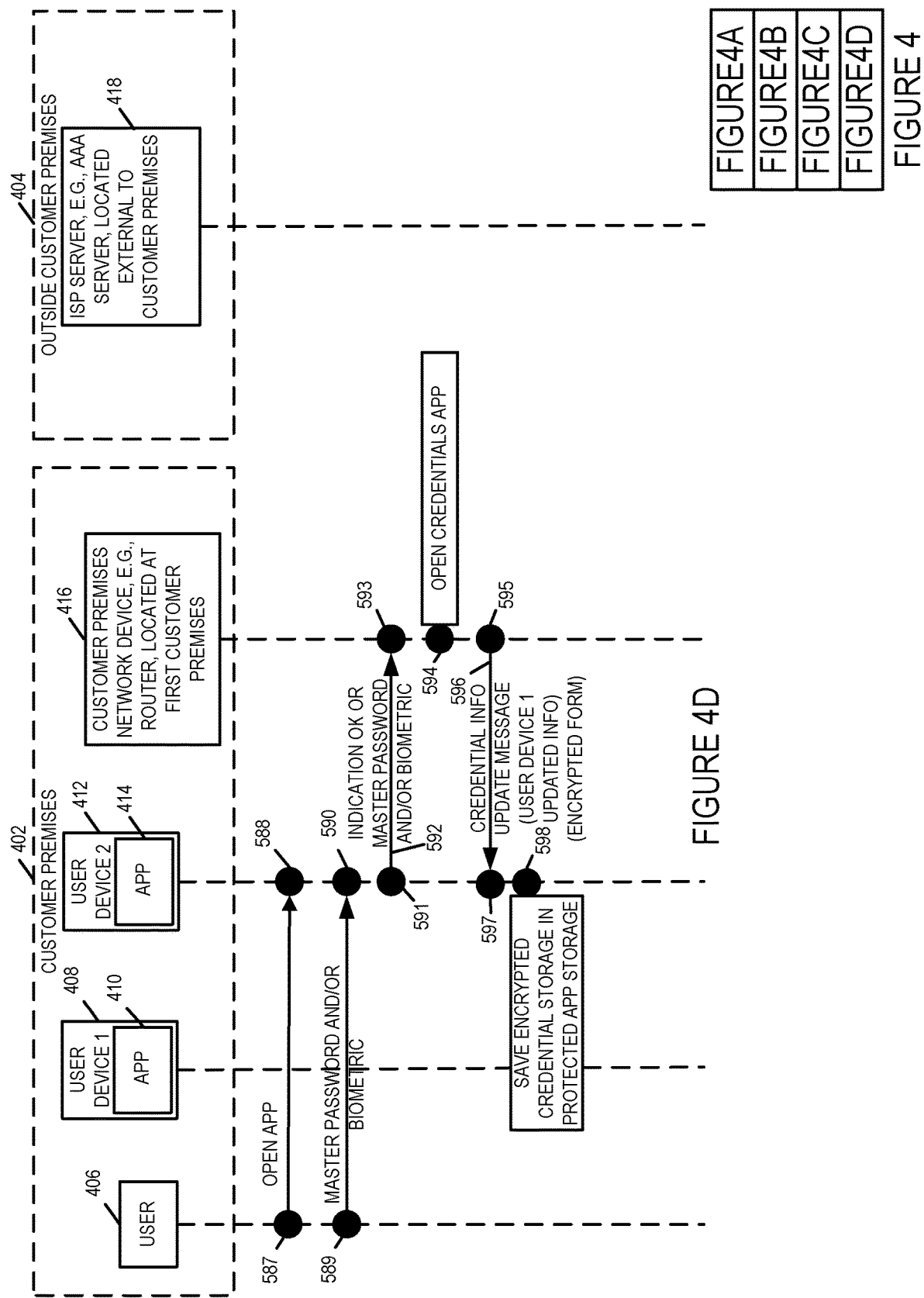

METHODS AND APPARATUS FOR SECURELY STORING, USING AND/OR UPDATING CREDENTIALS USING A NETWORK DEVICE AT A CUSTOMER PREMISES

FIELD

The present application relates to communications systems and/or methods which use credentials and, more particularly, to methods and apparatus for securely storing, using and/or updating credentials through the use of a network device, e.g., wireless access router, located at a customer premises.

BACKGROUND

For years now security pundits have been calling for the death of the password. Passwords are simple, often reused across accounts, shared, and even written down. This leads to increased security risk and fraud.

It is difficult to memorize a unique alphanumeric-16 character password containing symbols for each and every password. So most people use passwords that contain words with few numbers or symbols. Unfortunately hackers are familiar with these approaches. Common brute force password crackers can attempt half a billion passwords per minute meaning the majority of people's passwords can be cracked very quickly. Even if consumers are using complex passwords, they are still not secure if they reuse passwords. A quick search on what is sometimes called the dark web will allow you to purchase usernames and passwords.

Software applications that manage usernames and passwords and fill-in login forms based on passwords stored in the cloud, e.g., an Internet accessible server which stores passwords for many different households, businesses and customer premises have grown in popularity. At the same time they have become a target for hackers in part because of the potential access to thousands of user accounts and passwords that can be obtained by hacking and obtaining data from such an Internet based storage site.

Consumers want their data to be secure, but they value convenience higher. It would be desirable if users could be able to be provided with at least some of the convenience benefits of a password storage device that can store their passwords for multiple accounts but without some of the risks associated with using a readily accessible Internet based cloud storage site where passwords of many different customer premises are stored and which can be accessed via the Internet making the site readily accessible but at the expense of being subject to potential access by a hacker via the Internet.

Typically a user has a set of credentials, e.g. a username and a password, for each service to which the user subscribes. As the number of available services, e.g. news, social, entertainment, financial, etc., has vastly expanded in recent years, it has become difficult for a user to manage all of the different usernames and passwords that the user has acquired and needs to have readily available to gain access to the services. Manually recording of each set of credentials, e.g., in a record book or log, is one approach, but becomes cumbersome as the number of sets of credentials becomes very large, and the record book has to be carried to be always readily available.

If a user transfers the user's credentials to a remote site, e.g., to a server cloud in a cloud, via the Internet, there is the possibility that the transfer may not be secure and that the credentials are intercepted during the transfer. In addition, each time the stored credentials needs to be recalled by the user from the cloud storage another Internet transfer needs to occur. In addition, credentials stored at a remote location, over which the user has no control, may be susceptible to a hacking attack, which may or may not be reported to the user. This is in part due to the nature of a credential storage site containing credentials for many users, e.g., thousands of users corresponding to different homes, offices or customer premises, being a potential source of a large number of different user credentials with such information being potentially very valuable. It should be appreciated that the comparative worth of the credentials corresponding to users at a single customer premises is a potentially less lucrative target than a centralized storage site where credentials of many different users corresponding to different customer premises are located.

While centralized storage of large numbers of credentials corresponding to multiple different households can present a security risk, it would be desirable if a user could still have the advantages of a credential storage without some of the risks.

Based on the above discussion there is a need for new methods and apparatus of securely storing, using, and/or updating credentials which allow a user greater control over access to credentials and/or which reduce the risk of an unwanted party gaining access to the credentials of a user or group of users located at a customer premises.

SUMMARY

Methods and apparatus for securely storing, using and/or updating credential information, e.g., passwords and user IDs for a user who subscribes to one or more services, e.g., video stream services or other services available through a communications network such as the Internet, are described.

In various embodiments credential information corresponding to one or more users corresponding to a customer premises are stored in a network customer premises device, e.g., a wireless access router. The information is stored in some embodiments on non-volatile memory in network customer premises device in a secure manner, e.g., in encrypted form. In this way even if accessed via the Internet or a network connection the party receiving the information will not be able to decrypt and use the password information without master security information, e.g., a master password or biometric information, used to encrypt or decrypt the credential information. However, in some embodiments as a further level of security access to the set of stored credential information is limited to access via a local network, e.g., a wireless or wired network at a customer premises.

In some embodiments multiple family members may each have one or more user devices, e.g., mobile devices such as cell phones, set top boxes, streaming devices, etc. which they can use to access the stored credential information, e.g., via a local wired or wireless network at a customer premises site where the credential information is stored. The credential information can be, and sometimes is, then stored in encrypted form on the user's device so that it is available when the user is away from the customer premises and can not access the credential store via the local customer premises network. The stored credential information can be accessed directly from the user device store when it is available from secure storage on the user device or via the local network at the customer premises to obtain access from streaming servers which stream video or other content for consumption, e.g., display, to the user device.

In various embodiments to initially establish a credential store on the customer premises network device, a user provides, via a user device, ISP verification information used to prove to an ISP server that the user is entitled to receive services from the ISP provider. The ISP provider verifies the user supplied ISP credentials and once verified the user is allowed to provide and store credential information on the customer premises device, e.g., wireless access router, used to supply Internet services to the customer premises where the wireless access router is located. In this way an existing trust and authentication mechanism established for the purposes of providing Internet services can be leveraged to determine that a user should be allowed to store credential information on the wireless access router that is, at least in some cases, used to provide Internet access to devices at the customer premises where the wireless access router is located.

Once a user has passed the initial verification process, the user is allowed to store credential information on the customer premises network device, e.g., wireless access router. In some embodiments the credential information corresponding to a user is secured, e.g., encrypted, by the user device prior to being sent to the wireless access router for storage. In some embodiments the encryption and decryption of the credential information is performed by the user device using what is referred to as master security information. The master security information is in some embodiments a password, sometimes referred to as a master password since it is used to gain access to the credential information including other passwords. In other embodiments the master security information is biometric information that can be entered via a camera or scanner, e.g. finger print scanner on the user device. Thus the user device can decrypt the encrypted credential information and it need not be communicated over the local network in unencrypted format.

In some but not necessarily all embodiments, the network storage device which stored the encrypted information also has the ability to decrypt the stored information. However this function is normally used to provide a device on the local network a password and/or other information for an individual service, e.g., as part of a service request passing through the local router to the service providers server, and the full set of credential information, including multiple passwords for different services, in such embodiments is normally prevented from being decrypted and transmitted to another device in unencrypted form. In some embodiments the full set of encrypted information corresponding to a customer that is stored is restricted with access to such information via the Internet being blocked by use of a firewall or other methods.

After initial verification using the ISP login credentials, a user can enter passwords, user ID and service identifier information, e.g., a URL or IP address of a service provider such as Netflix. The information is then encrypted and communicated to the customer premises network device for storage on a portion of a storage device, e.g., non-volatile memory, located in the customer premises network device, allocated to the user for storage of credential information.

Communication of credential information between the customer premises network device, e.g., wireless access router, is conducted in some embodiments while the user devices are located at the customer premises and not when the devices are located outside the customer premises. The communication is with at least the passwords and possibly all the credential information being in encrypted form. Furthermore the passwords are stored in encrypted form.

In some embodiments communication of credential information is limited to communication which can occur in the customer premises. For example communication, if performed wirelessly, may be limited to signals directly sent to or from the wireless access router being used as the customer premises network device and or via a local Ethernet coupled to the wireless access router. Such embodiments add an additional level of physical security by requiring presence at the customer premises to be able to access or update, e.g., synchronize stored credential information with the customer premises network device.

It should be appreciated that since the end user devices are the devices responsible for encryption and decryption, parties other than the user of the user devices associated with the stored credential information should not be able to retrieve or use the passwords even if a copy is obtained since such unauthorized entities will lack the master security information needed for decryption of the encrypted stored credential information.

By using the customer premises device as the credential storage entity as opposed to a network server, the risk of theft of such information by a user accessing a network storage device at a centralized network location is avoided since the credential information is not transmitted to such a centralized location in some embodiments. The distributed nature of the storage with each customer storing his/her credential information on the network device located physically at their customer premises makes it far harder to access the stored passwords of multiple users which makes Internet based credential storage system which store credentials for hundreds or thousands of users such attractive targets.

In some embodiments once the credential information storage is initially set up, the user then uses the master security information to control encryption/decryption and accessing of locally stored copies of the user credential information.

Having loaded the credential information onto the customer premises network device, a user can load the information onto other user devices by simply connecting the devices, e.g., wirelessly or via a wired connection, to the customer premises network device. The user still needs to enter the master security information into the user device which is to obtain the credential information from the customer premises network device, e.g., wireless access router, so that it can decode and use the credential information but this is a trivial matter as compared to entering a large set of credential information, e.g., for multiple different streaming and/or Internet services.

In various embodiments when a user device is in the customer premises where the customer premises network device is located, it synchronizes its locally stored credential information with that stored in the customer premises network device. In this way changes or new passwords or service information entered into one device can be propagated to the wireless access router storage and securely propagated to other devices associated with the user providing the credential information.

In accordance with the methods and apparatus a user can quickly and securely provide a large amount of credential information to devices corresponding to the user which are, at least at some point in time, used in the customer premises where the wireless access router used to store the credential information is located. The methods are well suited for initializing and providing credential information to FireTV, Roku and/or other streaming devices which normally interact with a wireless access router at a customer premises and which often require credentials corresponding to multiple different services in order to be able to access such services.

Multiple family members can store their credential information on the wireless access router with different users being allocated different portions of memory for storing their credential information.

An exemplary method, in accordance with some embodiments, comprises: receiving at a customer premises network device, physically located at a first customer premises, a credential service setup request from a first user device while said first user device is physically located at the first customer premises of a first user of the first user device; validating the first user with an ISP provider; sending, from the customer premises network device, a request for master security information to said first user device requesting information for securing information in first user credential storage included in said network device located at the first customer premises; receiving at the customer premises network device, encrypted information corresponding to the first user sent from the first user device, said encrypted information corresponding to the first user including at least one password for a network service; and storing the encrypted information including one or more passwords, in encrypted form, on a portion of a storage device allocated to the first user, said storage device being located in the customer premises network device.

Numerous additional benefits and variations on the above described methods and apparatus are described in the detailed description which follows.

BRIEF DESCRIPTION OF THE FIGURES

FIG. 4D is a fourth part of a signaling flow diagram illustrating steps of an exemplary method including securely storing and updating credentials at a customer premises in accordance with an exemplary embodiment.

FIG. 4 comprises the combination of FIG. 4A, FIG. 4B, FIG. 4C and FIG. 4D.

FIG. 8A is a third part of an assembly of components which may be included in a user device, e.g., a mobile smart cell phone, in accordance with an exemplary embodiment.

DETAILED DESCRIPTION

Figure 1:
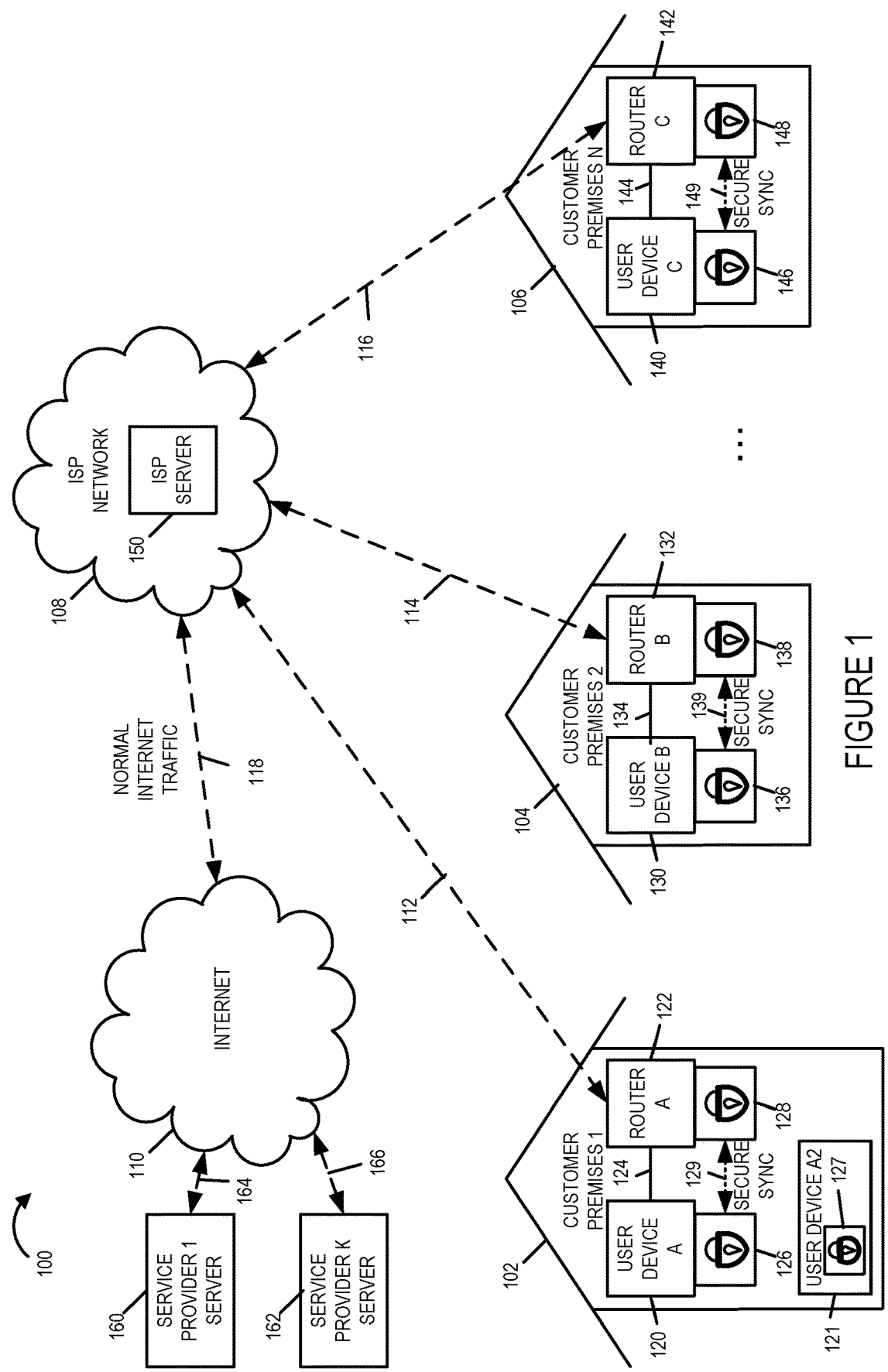
FIG. 1 is a drawing of an exemplary communications system in accordance with an exemplary embodiment.

FIG. 1 is a drawing of an exemplary communications system 100 in accordance with an exemplary embodiment. Communications system 100 includes a plurality of customer premises (customer premises 1 102, customer premises 2 104, . . . , customer premises N 106), an ISP network 108, the Internet 110, and a plurality of service provider server (service provider 1 server 160, . . . , service provider K server 162). Each customer premises includes a router, and one or more user devices, which are associated with the customer premises. User devices associated with a customer premises include one or more mobile devices, and in some embodiments, include one or more stationary user devices. User premises 1 102 includes user device A 120, e.g., a mobile phone, user device A2 121, e.g., a laptop computer, and router A 122. User premises 2 104 includes user device B 130, e.g., a mobile phone, and router B 132. User premises N 104 includes user device C 140, e.g., a mobile phone, and router C 142.

User device A 120, e.g., a mobile phone registered to a user residing at customer premises 1 102, is coupled to router A 122, e.g., a home WiFi router, via communications link 124, e.g., a wireless communications link. User device A2 121, e.g., a laptop computer registered to a user residing at customer premises 1 102, can be, and sometimes is coupled to router A 122, e.g., a home WiFi router, via a communications link, e.g., a wireless communications link. User device A 120 includes secure memory 126; user device A2 121 includes secure memory 127; and router A 122 includes secure memory 128. Secure memory 126, secure memory 127, and secure memory 128, include, e.g., stored securely encrypted credentials, e.g., for accessing one or more service providers. Contents within user device A secure memory 126 and home router A secure memory 128 are securely synchronized, e.g., via signals 129, when user device A 120 is located at customer premises 1 102, e.g. in response to a log-in. Contents within user device A2 secure memory 127 and home router A secure memory 128 are securely synchronized, e.g., via signals, when user device A2 121 is located at customer premises 1 102, e.g. in response to a log-in.

User device B 130, e.g., a mobile phone registered to a user residing at customer premises 2 104, is coupled to router B 132, e.g., a home WiFi router, via communications link 134, e.g., a wireless communications link. User device B 130 includes secure memory 136, and router B 132 includes secure memory 138. Secure memory 136 and secure memory 138, include, e.g., stored securely encrypted credentials. Contents within user device B secure memory 136 and home router B secure memory 138 are securely synchronized, e.g., via signals 139, when user device B 130 is located at user premises 2 104, e.g. in response to a log-in.

User device C 140, e.g., a mobile phone registered to a user residing at customer premises 3 106, is coupled to router C 142, e.g., a home WiFi router, via communications link 144, e.g., a wireless communications link. User device C 140 includes secure memory 146, and router C 142 includes secure memory 148. Secure memory 146 and secure memory 148, include, e.g., stored securely encrypted credentials. Contents within user device C secure memory 146 and home router secure memory 148 are secure synchronized, e.g., via signals 149, when user device C 140 is located at user premises N 106, e.g. in response to a log-in.

ISP network 108 includes ISP server 150. Each service provider server (service provider 1 server 160, . . . , service provider K server 162) is coupled to the Internet 110, via a communications link (164, . . . , 166), respectively. Normal internet traffic 118 flows between the Internet 110 and ISP network 108. Router A 122 of customer premises 1 102 is coupled to ISP network 108, via network communications link 112, e.g., a cable or fiber optic link. Router B 132 of customer premises 2 104 is coupled to ISP network 108, via network communications link 114, e.g., a cable or fiber optic link. Router C 142 of customer premises N 106 is coupled to ISP network 108, via network communications link 116, e.g., a cable or fiber optic link.

Physical credential storage is distributed across an individual user's router. Each router (122, 132, . . . , 142) has its own unique storage (128, 138, . . . , 148), respectively. Credential storage is encrypted with user defined master keys. The user of user device A 120 has a user defined master key for its credential storage, which is stored in user device secure memory 126 and home router secure memory 128. The user of user device B 130 has a user defined master key for its credential storage, which is stored in user device secure memory 136 and home router secure memory 138. The user of user device B 140 has a user defined master key for its credential storage, which is stored in user device secure memory 146 and home router secure memory 148. No sensitive data is passed over the internet, ISP, or any public network. The ISP, e.g., ISP server 150, does not have access to Router credential storage (128, 138, . . . , 148).

Figure 2:
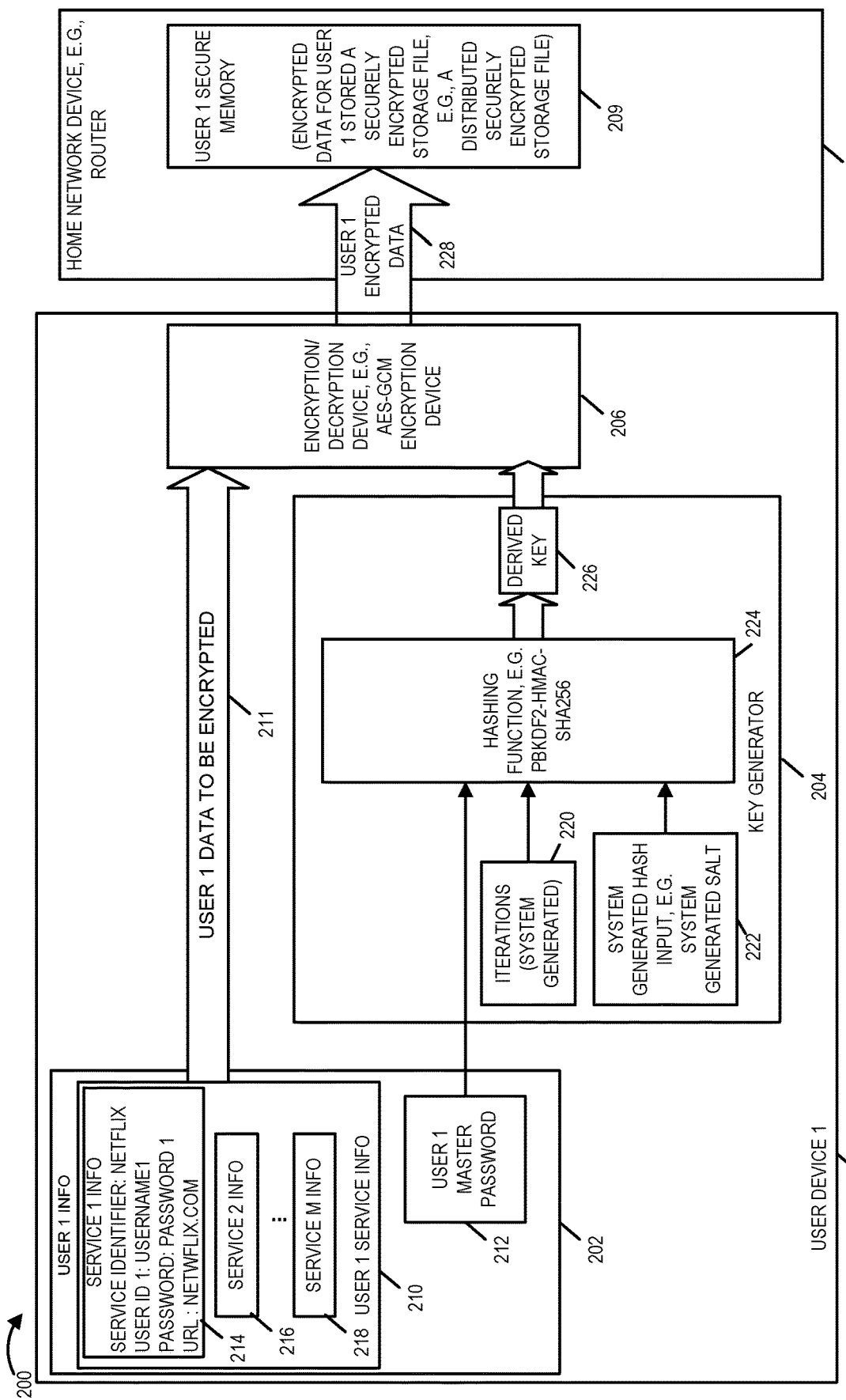
FIG. 2 is a drawing illustrating an exemplary encryption process in accordance with an exemplary embodiment.

FIG. 2 is a drawing 200 illustrating an exemplary encryption process in accordance with an exemplary embodiment. Drawing 200 includes exemplary user device 1 201 and home network device 208, e.g., a router. User device 1 201 and home network device 208 of FIG. 2 are, e.g., one of the pair of (user device A 120 and router A 122, user device B 130 and router B 132, or user device C 140 and router C 142) of system 100 of FIG. 1.

User device 1 201 includes user 1 information 202, key generator 204 and encryption/decryption device 206, e.g., a device which performs encryption and decryption. User 1 information 202 includes user 1 service information 210 and a user 1 master password 212. User 1 service information 210 includes one or more sets of service information (service 1 information 214, service 2 information 216, . . . , service M information 218). Each set of service information includes, e.g., a service identifier, a user ID, a Password, and a URL. For example, service 1 information 214 includes: i) service identifier: NETFLIX; ii) user ID 1: Username 1; iii) Password: Password 1; and iv) URL: NETFLIX.com.

Key generator 204 includes a hashing function 224, e.g., a PBKDF2-HMAC-SHA256, a systems generated iterations number 220, and a system generated hash input, e.g., a system generated salt value. In some embodiments, the salt is a MAC address entangled with a unique random value. In some embodiments, iterations is a sufficiently high number of hashing iterations, e.g., a value greater than 10,000. Hashing function 224 receives as input: i) the user 1 master password 212, ii) the iterations number 220 and iii) the system generated hash input 222, and the hashing function 224 generates and outputs a derived key 226.

Encryption/decryption device 206, e.g., an Advanced Encryption Standard—Galois/Counter Mode (AEM-GCM) encryption device, receives as input: i) user 1 data to be encrypted 211, which includes user 1 service information 210, and ii) derived key 226, and encryption device encrypted the user 1 data to be encrypted 211, using the derived key 226, resulting in user 1 encrypted data 228. User 1 encrypted data 228, which is output from the encryption device 206 is input and stored in user 1 secure memory 209, which is a portion of the secure memory which is included in the home network device 208, e.g., home network router. In some embodiments, the user 1 encrypted data is stored in a securely encrypted storage file, e.g., a distributed securely encrypted storage file.

Figure 3:
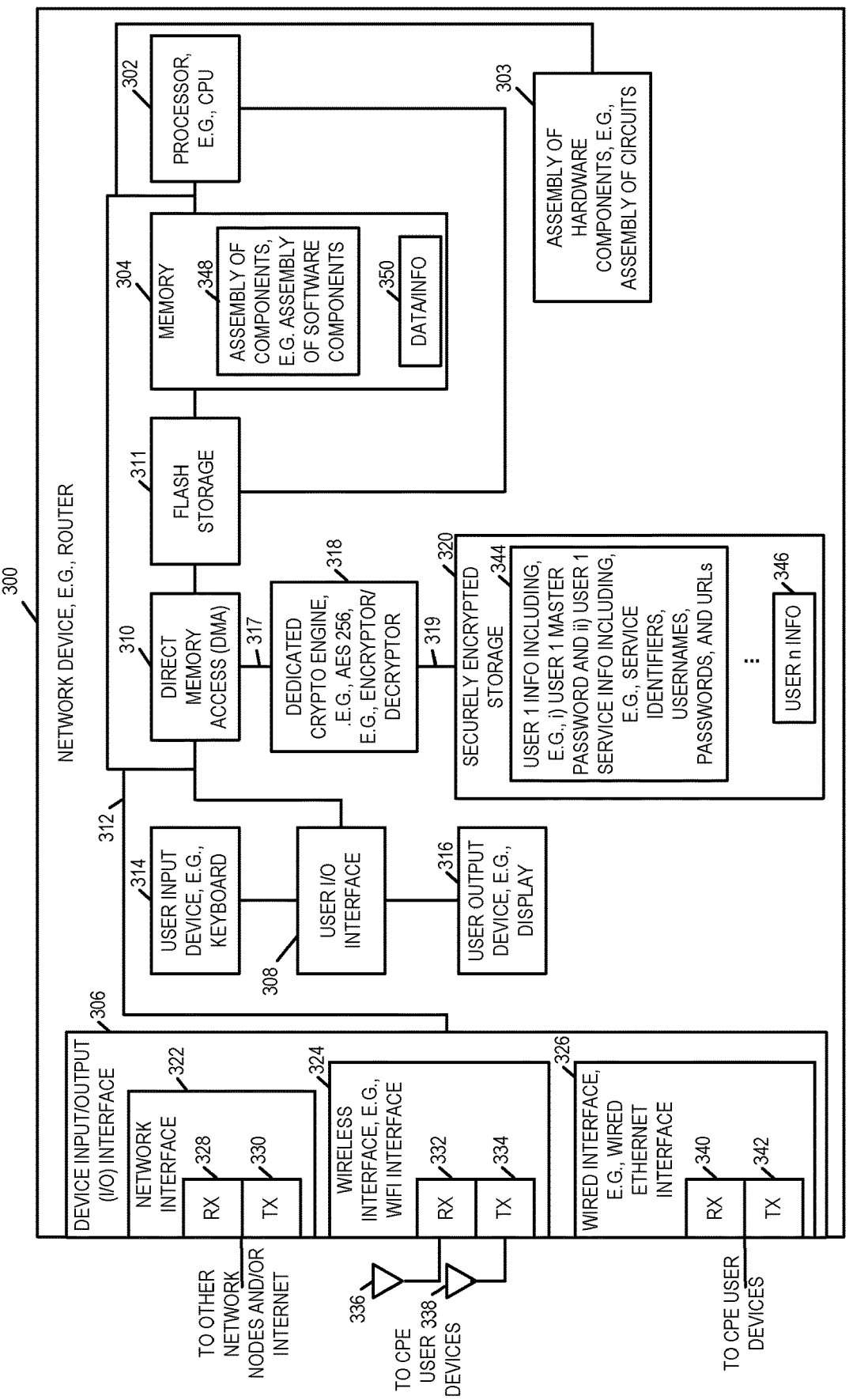
FIG. 3 is a drawing of an exemplary network device, e.g., a wireless access router located at a customer premises, in accordance with an exemplary embodiment.

FIG. 3 is a drawing of an exemplary network device 300, e.g., a router, in accordance with an exemplary embodiment. Exemplary network device 300 is, e.g., a customer premises network device. Network device 300 is, e.g., one of router (122, 132, . . . , 142) of system 100 of FIG. 1. Network device 300 includes a processor 302, e.g., a CPU, an assembly of hardware components 303, e.g., an assembly of circuits, a memory 304, a device input/output (I/O) interface 306, a user I/O interface 308, and a direct memory access (DMA) component 310 coupled together via a bus 312 over which the various elements may interchange data and information. Memory 304 includes assembly of components 348, e.g., an assembly of software components, and data/information 350. Network device 300 further includes flash storage 311, which is coupled to memory 304, processor 302 and DMA 310.

Network device 300 further includes a dedicated crypto engine 318, e.g., an AES 256, e.g., an encryptor/decryptor, and securely encrypted storage 320. The DMA 310 is coupled to the dedicated crypto engine 318, via link 317. The dedicated crypto engine 318 is coupled to the securely encrypted storage 320, via link 319. The securely encrypted storage 320 includes information corresponding to one or more users, e.g., users registered as having router 300 as their home network router. For example, each of the users may be members of the same family, each having their own user device, e.g., mobile phone, and each having their own secure memory stored within securely encrypted storage 320 of router 300. Securely encrypted storage 320 includes user 1 information 344, which is stored in an encrypted format, . . . , user n information 346, which is stored in an encrypted format. User 1 information 344 includes, e.g., i) a user 1 master password and ii) user 1 service information including, e.g., service identifiers, usernames, passwords, and URLs.

Network device 300, e.g., a router, includes a user input device 314, e.g. a keyboard, and a user output device 316, e.g., a display, coupled to user I/O interface 308, via which an operator of network device 300 may input data, and/or information, e.g., including commands and device control information, and receive, e.g., view, output data and information including, e.g., network device 300 status information.

Device I/O interface 306 includes a network interface 322, a wireless interface 324, e.g., a WiFi wireless interface, and a wired interface 326, e.g., a wired Ethernet interface. Network interface 322 includes a receiver 328 and a transmitter 330, via which the network device 300 may receive and send, respectively, signals to other network nodes, e.g., ISP server 150, the Internet 110, and/or a service provider server, e.g., server 160 or server 162.

Wireless interface 324 includes a wireless receiver 332 and a wireless transmitter 334. Wireless receiver 332 is coupled to receive antenna 336, via which the network device 300 may receive wireless signals, e.g., wireless WiFi uplink signals from customer premises equipment (CPE) user devices, e.g., a user mobile phone. Wireless transmitter 334 is coupled to transmit antenna 338, via which the network device 300 may transmit wireless signals, e.g., wireless WiFi downlink signals to customer premises equipment (CPE) user devices, e.g., a user mobile phone. In some embodiments, multiple antennas may be, and sometimes are used for one or both of receiver 332 and transmitter 334. In some embodiments, one or more or the same antennas may be, and sometimes are, used for receiver 332 and transmitter 334

Wired interface 326, e.g. a wired Ethernet interface, includes a receiver 340 and a transmitter 342, via which the network device 300 may receive and sends signals to CPE user devices coupled to a wired home network corresponding to network device 300.

Figure 4A:
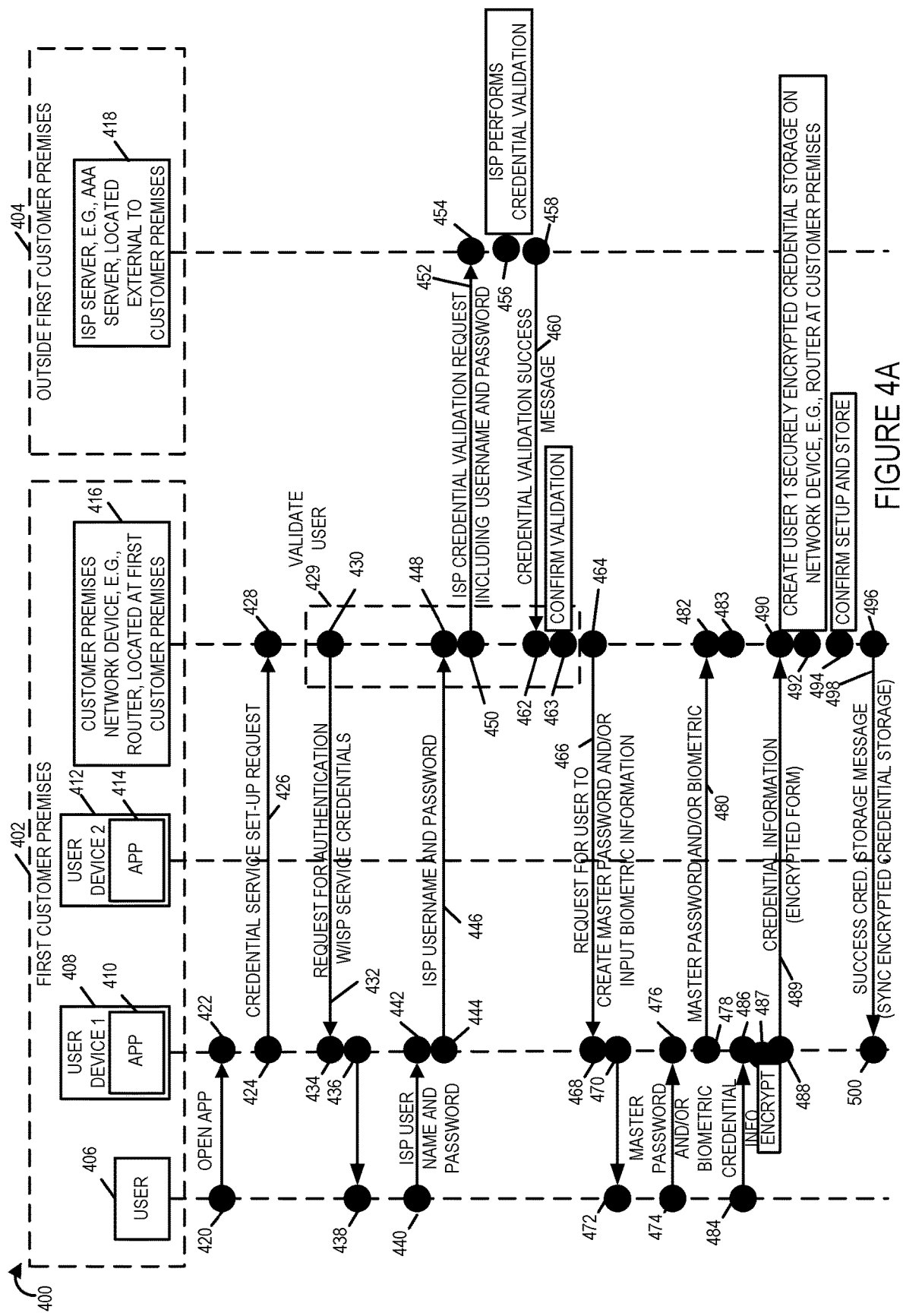
FIG. 4A is a first part of a signaling flow diagram illustrating steps of an exemplary method including securely storing and updating credentials at a customer premises in accordance with an exemplary embodiment.
Figure 4B:
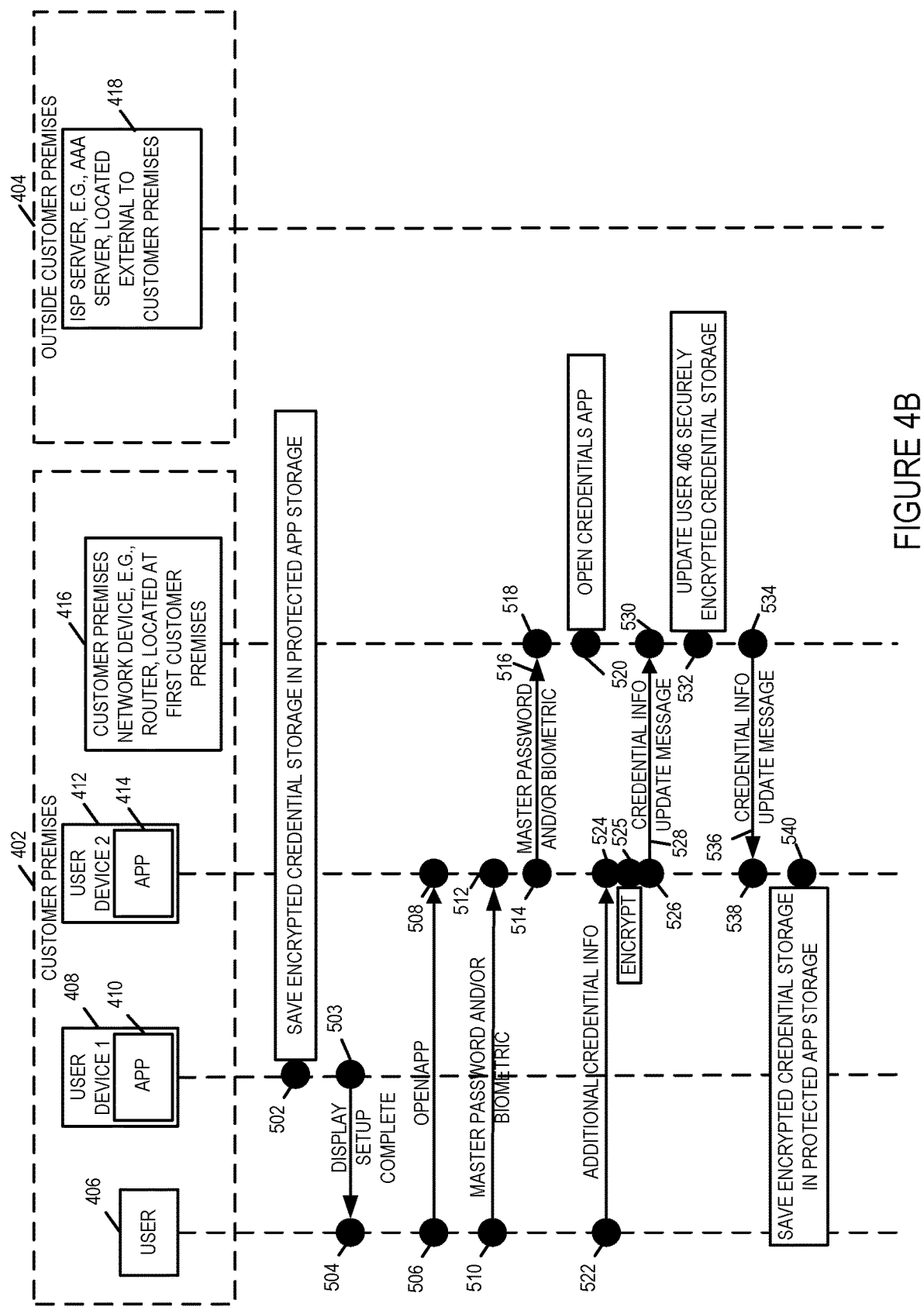
FIG. 4B is a second part of a signaling flow diagram illustrating steps of an exemplary method including securely storing and updating credentials at a customer premises in accordance with an exemplary embodiment.
Figure 4C:
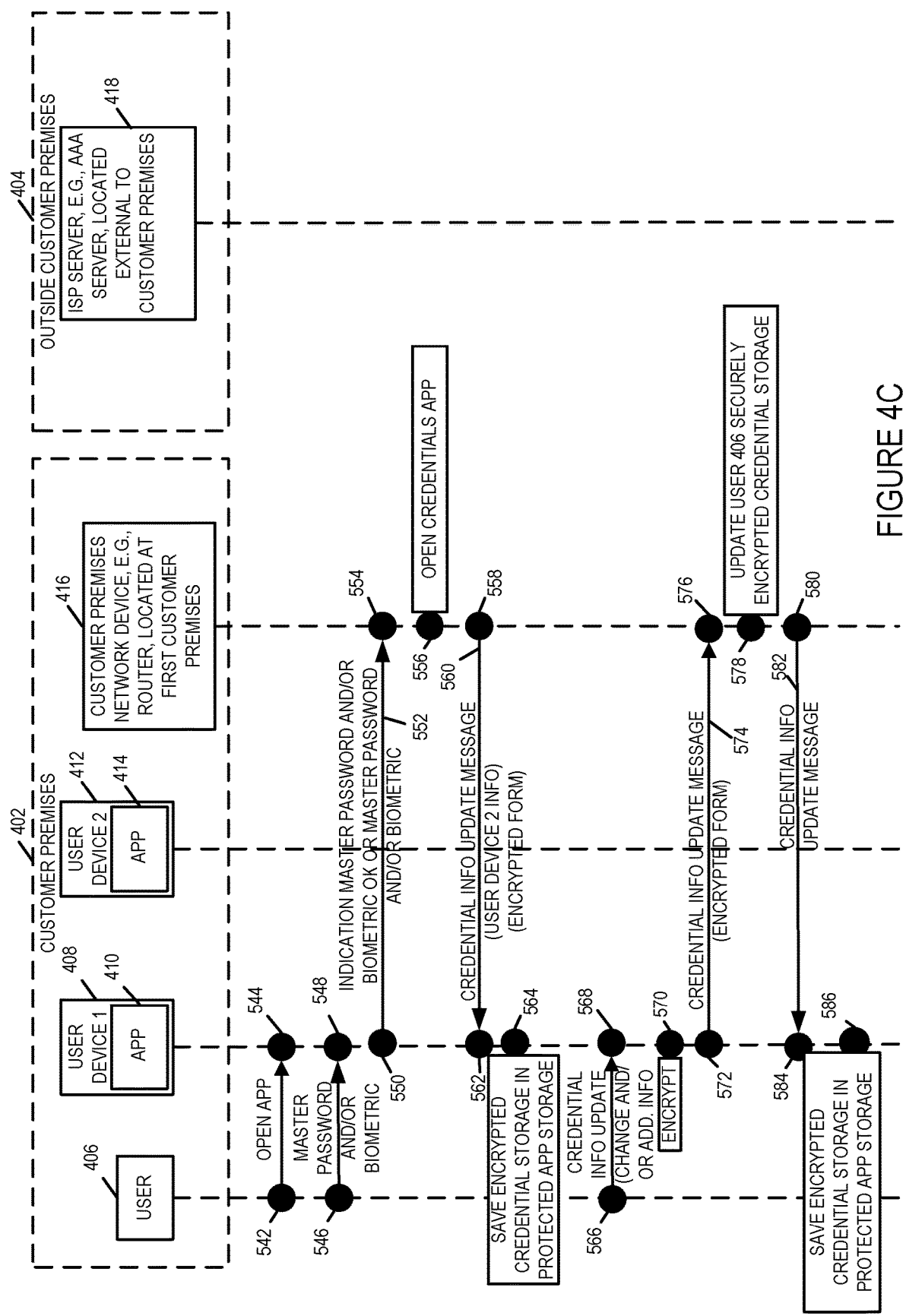
FIG. 4C is a third part of a signaling flow diagram illustrating steps of an exemplary method including securely storing and updating credentials at a customer premises in accordance with an exemplary embodiment.

FIG. 4, comprising the combination of FIG. 4A, FIG. 4B, FIG. 4C and FIG. 4D, is a signaling flow diagram 400 illustrating steps of an exemplary method in accordance with an exemplary embodiment. Signaling flow diagram 400 includes user 406, user device 1 408, user device 2 412, customer premises network device 416, e.g., a wireless router, e.g., a WiFi router, located at a first customer premises, and a ISP server, e.g., a AAA server, located external to the customer premises.

In the example of FIG. 4, user 406, user device 1 408, e.g., a first mobile device belonging to user 406 such as a mobile phone belonging to user 406, user device 2 412, e.g., a second mobile device belonging to user 406 such as a laptop computer belonging to user 406, and the customer premises network device 416, e.g., a home wireless router, are located at first customer premises 402. The ISP server 418, e.g., an Authentication, Authorization, and Accounting (AAA) server, is located outside the first customer premises 404, e.g., a central office location.

User device 1 408 includes an application (APP) 410, e.g., a credential application. User device 2 412 includes an APP 414, e.g., a credentials application. In one embodiment, first customer premises 402 is customer premises 1 102 of FIG. 1, user device 1 408 is user device A 120 of FIG. 1, customer premises network device 416 is router A 122 of FIG. 1, ISP server 416 is ISP server 150 of FIG. 1, user 406 is the owner of user device 1 408, and user device 2 412 is a second user device, e.g., user device A2 121 of FIG. 1 also owned by user 406.

In step 420 user 406 opens the app 410 on user device 1 408. In step 422, user device 1 408 detects that user 406 has opened app 410. In step 424, user device 1 406 generates and sends a credential service set-up request 426 to customer premises network device 416. In step 428 the customer premises network device 416, e.g., a router, which is physically located at the first customer premises 402, e.g., a home or office, receives the credential service set-up request 426 from user device 1 408, e.g., a mobile device such as a cell phone of user 406, and in response, starts operations 429 to validate the user.

In step 430 the customer premises network device 416 generates and sends a request for authentication with ISP service credentials 432 to user device 1 408. The authentication request is, e.g., a challenge or request for user credentials such as an ISP username and password for logging in with the ISP which can be used to authenticate user 406 to the user device 1 408. In step 434 user device 1 408 receives the request for authentication 432, and in step 436 user device 1 408 presents the request for authentication to user 406.

In step 438 user 406 views the request for authentication, and in step 440 user 406 enters an ISP username and password. In step 442 user device 1 408 detects the entered ISP username and password. In step 444 user device 1 408 sends a message 446 to customer premises network device 416 communicating the entered ISP username and password. In step 448 the customer premises network device 416 receives message 446 from user device 1 408 and recovers the ISP username and password, which are ISP login credentials. In step 450, the customer premises network device 416 generates and sends an ISP validation request message 452 to ISP server 418, said ISP validation request message 452 including the ISP username and password, which was included in message 446. In step 454 the ISP server 418 receives the ISP credential validation request 452, and recovers the communicated information. In step 456 the ISP server 418 performs a credential validation based on the credential information recovered from message 452 and stored information corresponding to user 406 and/or user device 408. If the credential validation indicates that the validation was a success, e.g., validation test passed, then operation proceeds from step 456 to step 458.

In step 458 the ISP server 418 generates and sends a credential validation success message 460 to customer premises network device 416. In step 462 the customer premises network device receives the credential validation success message 460, and in response, in step 463 the customer premises network device 416 confirms validation. Steps 430, 432, 448, 450, 462 and 463 are included as part of user validation step 429.

In response to the confirmed validation of step 463, the customer premises network device 416, in step 464 generates and sends a request 466 for the user 406 to create a master password and/or input biometric credential information to user device 1 408, said request requesting information for securing information in user credential storage for user 406 included in network device 416 located at the first customer premises 402. The request to create a master password and/or input biometric information is a request for master security information, e.g., a master password or biometric information which will be used to secure credential information corresponding to user 406 and control subsequent access to such information. In step 468 user device 1 408 receives request 466, and in step 470 user device 1 408 presents, e.g., displays, the request for the user the user to create a master password and/or input biometric credential information to user 406.

In step 472 user 406 views the request for the master password and/or for the input of biometric information, and in response in step 474, user 406 enters a user generated master password and/or inputs biometric information of user 406, e.g., one or more fingerprint scans of user 406, one or more images, e.g. captured pictures of the face of user 406, one or more voice inputs from user 406, eye scans from user 406, etc. In step 476 user device 1 408 receives the entered master password and/or the input biometric information. In step 480 user device 1 process the received master password and/or the received biometric information, generates a message 480 communicating the received master password and/or a representation, e.g., a digital file representation, of the biometric information, and sends message 480 to customer premises network device 416. In step 482, the customer premises network device 416 receives message 480 communicating the master password and/or biometric information, and recovers the communicated information. In step 483, the customer premises network device 416 stores the master password and/or biometric information, e.g., in encrypted form.

In step 484, user 406 enters credential information corresponding to a service provider, e.g., a username and password used for log-in to the service provider. In step 486 user device 1 408 detects and recovers the entered user 406 credential information corresponding to the service provider. In step 487 user device 1 408 encrypts information including the credential information corresponding to the service provider, e.g., using the master password, a system generated iteration number, and a system hash input, e.g., a salt. In some embodiments, the encryption operation of step 487 is as shown in the example of FIG. 2. In step 488 user device 1 408 generates and sends message 489, which includes the credential information received in step 480 in encrypted form to customer premises network device 416. In step 490 customer premises network device 416 receives the credential information corresponding to user 406 in encrypted form sent from user device 408, said encrypted information corresponding to user 406 including at least one password for a network service. In step 492 the customer premises network device 416 creates user 406 securely encrypted credential storage on the network device 416, e.g., router, located at the fist customer premises 402. In step 494 the customer premises network device 416 confirms setup and stores the received credential information in encrypted form for user 406, which was received from user device 1 408 in step 490. Step 494 includes storing the encrypted information including one or passwords, in encrypted form, on a portion of a storage device allocated to user 406, the storage device being located in the customer premises network device 416.

In step 496 the customer premises network device 416 generates and sends a success credential storage message 498 to user device 1 408, indicating successful credential storage for user 406. In some embodiments message 498 includes synchronized encrypted credential storage, e.g., a latest copy of the encrypted credential storage for user 406. In some embodiments, the successful credential storage message 498 is sent with credential synchronization information providing user device 1 408 with a copy of at least some encrypted credential information stored on the portion of a storage device included in the customer premises network device 416 allocated to user 406. In step 500 user device 1 408 receives success credential storage message 408 and recovers the communicated information.

In step 502 user device 1 408 saves the received encrypted credential storage in protected app storage on device 408. In step 503 user device 1 408 displays or indicates setup complete to user 406. In step 504 user 406 views the setup compete message or indication.

In step 506, user 406, who is now operating user device 2 412, performs an operation to open an APP, e.g., credentials APP 414, on user device 2 412. In step 508, user device 2 412 detects that user input has been received to open the APP. In step 510, user 406 enters the master password and/or inputs user 406 biometric information to the user interface of user device 2 412. In step 512 user device 2 412 receives the master password and/or user 406 biometric information, e.g., a fingerprint scan, a captured image or user 406's face, etc. and processes the information.

In step 514 user device 2 412 generates and sends a message 516 to customer premises network device 416 communicating the received master password and/or biometric information. In step 518 the customer premises network device 416 receives message 516, recovers the communicated information and compares the communicated information to a stored copy of the master password and/or stored biometric information for user 406. If the comparison is successful, then in step 520, the customer premises network device 416 opens a credentials app.

In step 522 user 406 inputs additional credential information to user device 2 412, which is detected and received by user device 2 412, which is currently located in the first customer premises 402, in step 524. In some embodiments, the additional includes at least one new or changed password used by user 406 to obtain a service available to user 406. In step 525, user device 2 412 encrypts the received additional credential information, using the master password, an iterations value, and a generated hash input, e.g. salt value.

In step 526, user device 2 412 generates and sends a credentials information update message 528, including the received additional credential information in encrypted form, to customer premises network device 416. In step 530 the customer premises network device 416 receives credential information update message 528 including in encrypted form at least one new or changed password used by the user 406 to obtain a service available to user 406, and in step 532 the customer premises network device 416 updates the user 406 securely encrypted credential storage. Thus the user 406 securely encrypted credential storage now includes user 406 service provider credential information which was received from both user device 1 408 and user device 2 412.

In step 534, the customer premises network device 416 generates and sends a credential information update message 536, e.g., to user device 2 412 corresponding to user 406, while user device 2 412 is at the first customer premises 402. The credential information update message 536 communicates one or more passwords, in encrypted form, to user 406 for storage in a credential information store on user device 2 412, e.g., where the update includes one or more passwords and service information entered by another device such a user device 1 408 and which were not manually entered into user device 2 412 by user 406. In some embodiments the credential information update message includes credential information which was previously entered via user device 1 408, in encrypted form, and credential information which was received via user device 2 412, e.g. in encrypted form. In step 538 user device 2 412 receives credential information update message 536. In step 540 user device 2 412 saves the received encrypted credentials in protected app storage. The user 406 securely encrypted credential storage on customer premises network device 416 is now synchronized with the user 406 securely encrypted credential storage on user device 2 412.

In step 542, user 406, who is now again operating user device 1 408, performs an operation to open an APP, e.g., credentials APP 410, on user device 1 408. In step 544, user device 1 408 detects that user input has been received to open the APP. In step 546, user 406 enters the master password and/or inputs user 406 biometric information to the user interface of user device 1 408. In step 548 user device 1 408 receives the master password and/or user 406 biometric information, e.g., a fingerprint scan, a captured image or user 406's face, etc., processes the information, compares the received information against stored information, e.g., a stored master password and/or stored biometric information for user 406, and determines whether or not the entered master password is correct and/or if the detected biometric information corresponds to user 406. If the comparison check or checks pass, then, in step 550, user device 1 408 generates and sends a message 552 to customer premises network device 416 communicating: i) an indication that the received master password and/or detected biometric information is ok or ii) the received master password and/or biometric information. In step 554 the customer premises network device 416 receives message 552 from user device 1 408, while user device 1 408 is located at the first customer premises 402, and recovers the communicated information, e.g., the master security information corresponding to user 406.

In some embodiments, in response to a received indication that the check of the master password and/or biometric information performed by user device 1 408 was ok, operation proceeds to step 556 in which the customer premises network device 416 opens a credentials app. In some embodiments, customer premises network device 416 compares the communicated received master password and/or detected biometric information to a stored copy of the master password and/or stored biometric information for user 406, and if the comparison is successful, then in step 556, the customer premises network device 416 opens a credentials app.

In step 558, customer premises network device 416 generates and sends a credential information update message 560, e.g., including credentials information in encrypted form, which was received via user device 2 412, to user device 1 408. The credential information update message 560 communicates one or more passwords in encrypted form corresponding to user 406 for storage in a credential information store on the first user device 408, e.g., where the update includes one or more passwords and service information entered by another device such as user device 2 412 and which were not manually entered into user device 1 408 by the user 406. In step 562 user device 1 408 receives the credential information update message 560. In step 564, user device 1 408 saves the communicated encrypted credential information, communicated in message 560 in its secure protected app storage.

The user 406 securely encrypted credential storage on customer premises network device 416 is now synchronized with the user 406 securely encrypted credential storage on user device 1 408. The user 406 securely encrypted credential storage on user device 2 416 is now also synchronized with the user 406 securely encrypted credential storage on user device 1 408.

In step 566 user 406 decides to change credential information or add additional credential information, and enters the change or the additional information via user device 1 408. In step 568 user device 1 408 receives and/or detects credential change information and/or additional credential information, e.g., a changed password corresponding to a service provider log-in for which a password is already stored in encrypted form, or a new set of service provider information, e.g. another log-in user name and another log-in password corresponding to a new service to which user 406 has subscribed. In step 570 user device 1 encrypts the received credential information update information and/or received additional credential information, e.g., using the master password, the iterations number, and the salt value.

In step 572, user device 1 408 generates and sends a credential information update message 574 communicating the updated credential information and/or new additional credential information, in encrypted form, to the customer premises network device 416.

In step 576 the customer premises network device 416 receives from user device 1 408 credential information update message 574 including in encrypted form, at least one new or changed password used by user 406 to obtain a service available to user 406, and in step 578 the customer premises network device 416 updates the user 406 securely encrypted credential storage, e.g., storing the received updated credential information on the portion of the storage device included in said customer premises network device 416 which is allocated to user 406.

In step 580, the customer premises network device 416 generates and sends a credential information update message 582, to user device 1 408. In step 584 user device 1 408 receives credential information update message 582. In step 586 user device 1 408 saves the received encrypted credentials information included in message 582 in protected app storage. The user 406 securely encrypted credential storage on customer premises network device 416 is now synchronized with the user 406 securely encrypted credential storage on user device 1 408. At this point user device 2 412 has a local copy of secure user 406 credentials storage which has not been updated with the change in credentials which was communicated in credentials information update message.

In step 587, user 406, who is now again operating user device 2 412, performs an operation to open an APP, e.g., credentials APP 414, on user device 2 412. In step 588, user device 2 414 detects that user input has been received to open the APP. In step 589, user 406 enters the master password and/or inputs user 406 biometric information to the user interface of user device 2 412. In step 590 user device 2 412 receives the master password and/or user 406 biometric information, e.g., a fingerprint scan, a captured image or user 406's face, etc., processes the information, compares the received information against stored information, e.g., a stored master password and/or stored biometric information for user 406, and determines whether or not the entered master password is correct and/or if the detected biometric information corresponds to user 406. If the comparison check or checks pass, then, in step 591, user device 2 412 generates and sends a message 592 to customer premises network device 416 communicating: i) an indication that the received master password and/or detected biometric information is ok or ii) the received master password and/or biometric information. In step 593 the customer premises network device 416 receives message 592, recovers the communicated information.

In some embodiments, in response to a received indication that the check of the master password and/or biometric information performed by user device 2 412 was ok, operation proceeds to step 594 in which the customer premises network device 416 opens a credentials app. In some embodiments, customer premises network device 416 compares the communicated received master password and/or detected biometric information to a stored copy of the master password and/or stored biometric information for user 406, and if the comparison is successful, then in step 594, the customer premises network device 416 opens a credentials app.

In step 595, customer premises network device 416 generates and sends a credential information update message, e.g., including user 406 updated credential information, e.g., received in message 574 from user device 1 406, in encrypted form, to user device 2 412. In step 597 user device 2 412 receives the credential information update message 596. In step 598, user device 2 412 saves the communicated encrypted credential information, communicated in message 596 in its secure protected app storage. At this point the user 406 secure encrypted credential storage, stored locally on user device 2 412 is synchronized with the copy on customer premises network device 416 and the copy on user device 1 408.

Figure 5:
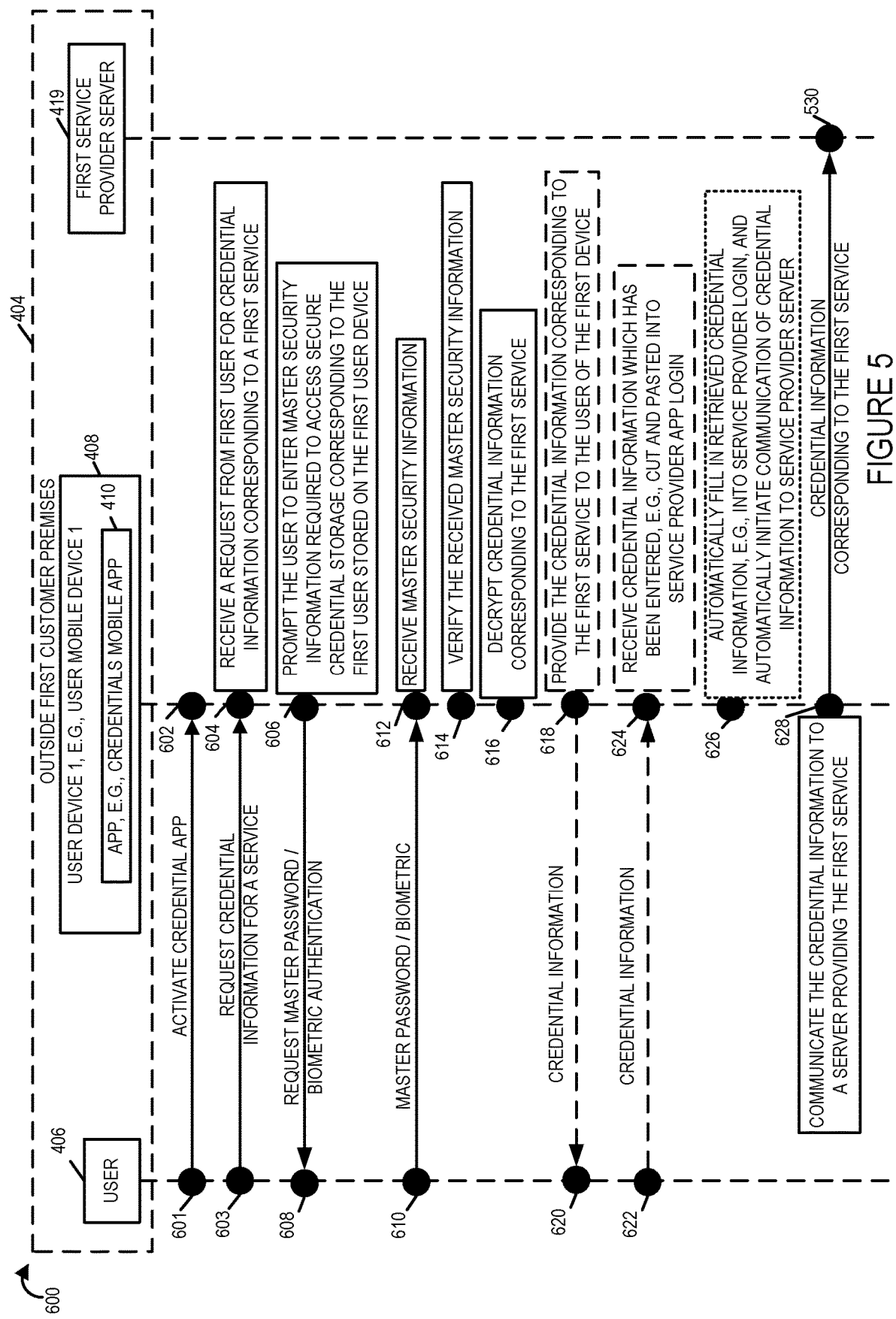
FIG. 5 is a signaling flow diagram illustrating steps of an exemplary method including using securely stored credentials which are stored on a user device while the user device is located outside the customer premises in accordance with an exemplary embodiment.

FIG. 5 is a signaling flow diagram 600 illustrating steps of an exemplary method in accordance with an exemplary embodiment. Signaling flow diagram 600 includes user 406, user device 1 408, and first service provider server 419. In the example of FIG. 5, user 406, user device 1 408, e.g., a first mobile device belonging to user 406 such as a mobile phone belonging to user 406, and first service provider server 419 are located outside the first customer premises, said outside area 404 being an area which does not include customer premises network device 416, e.g. a home network router, for user device 1 408.

User device 1 408 includes an application (APP) 410, e.g., a credentials application. In one embodiment, first customer premises 402 is customer premises 1 102 of FIG. 1, user device 1 408 is user device A 120 of FIG. 1, user 406 is the owner, e.g., registered user of user device 1 408, ISP server 418 is ISP server 150 of FIG. 1, and first service provider server 419 is service provider 1 server 160 of FIG. 1.

In step 601 user 406 performs an operation, e.g., touches a touch screen button, to activate the credentials app on user device 1 408. In step 602, user device 1 408 detects that user input has been received to activate the credentials app, e.g., user device 1 408 detects screen input indicating selection of the credentials app. In step 603 user 406 requests credential information for a service. In step 604 user device 1 408 receives a request for a first user, e.g., user 406, for credential information corresponding to a first service, e.g., first user device 408 receives user provider information indicating the network service for which credential information is being requested. In step 606 user device 1 406 prompts the user 406 to enter master security information required to access secure credentials storage corresponding to the first user, e.g. user 406, stored on the first user device 408, e.g., user device 408 displays a prompt to enter master security information, e.g., a master password or biometric information used for authentication to access secure credential storage.

In step 608, user 406 views the request for the master password and/or biometric authentication information. In step 610 user 406 enters the master password, e.g., via a keypad, and/or provides biometric information, e.g., via a scan, camera, and/or microphone user interface, to user device 1 408. In step 612 user device 1 408 receives the master security information, e.g., master password and/or user 406 biometric information used for authentication. For example, the master password is entered via a touch screen or a keypad, or biometric information is entered via a scanner such as a fingerprint scanner or camera included in user device 408. In step 614, user device 1 408 verifies the received master security information.

In step 616 user device 1 408 accesses encrypted credential information corresponding to user 406 and the first service, and decrypts the encrypted credential information to recover unencrypted credential information corresponding to the first service.

In some embodiments, operation proceeds from step 616 to step 618; in other embodiments, operation proceeds from step 616 to step 626. In step 618 the user device 1 provides the credential information corresponding to the first service to the user, e.g. user 406, of the first device 408, e.g., displays the information to the user 406 so the user 406 can copy it and use it to log in to the first service. In step 620 user 406 receives the credential information for the first service. In step 622, user 408 performs operations, e.g., performs cut and paste operations to paste the provided credentials into a service provider app log-in for the first service. In step 624, the user device 408 receives credential information which has been entered, e.g. cut and pasted into the service provider log-in app for the first service. Operation proceeds from step 624 to step 628.

In step 626 user device 1 408 automatically fills in the retrieved credential information from step 616, e.g., into the service provider log-in for the first service, and automatically initiates communication of credential information to the service provider server. Operation proceeds from step 624 to step 628.

In step 628 user device 1 408 communicates the credential information to a server, e.g., server 419, providing the first service.

In some embodiments, e.g., an embodiment including step 626 and 628, the user device 408 automatically initiates login to the first service using the stored URL corresponding to the first service and provides the user identifier and password to the first service server to automatically login without the need for the user to take additional action such as copying and pasting the password to complete the login operation.

In some embodiments, the customer premises network device (416) is a wireless access point with network connectivity to the ISP server (418), the first user device (408) is a cell phone; and said encrypted information including one or more passwords stored on the portion of the storage device allocated to the first user includes at least a first identifier (e.g. URL) of a first video streaming service (e.g., Netflix), a first user identifier (e.g., Netflix user ID of the first user) used to identify the first user to the first video streaming service; and a password used by the first user with the first video streaming service.

FIG. 5 has been described with user 406 and user device 1 408 being outside the first customer premises and with user device 1 408 retrieving credentials from its locally stored copy of secure encrypted credentials. Similar operation are performed with regard to user device 2 410, when user 406 and user device 2 410 are outside the first customer premises with user device 2 412 retrieving credentials from its locally stored copy of secure encrypted credentials.

In some embodiments, the steps of FIG. 4 are performed and then the steps of FIG. 5 are performed, e.g., as part of single method of operating a communications system.

Figure 6:
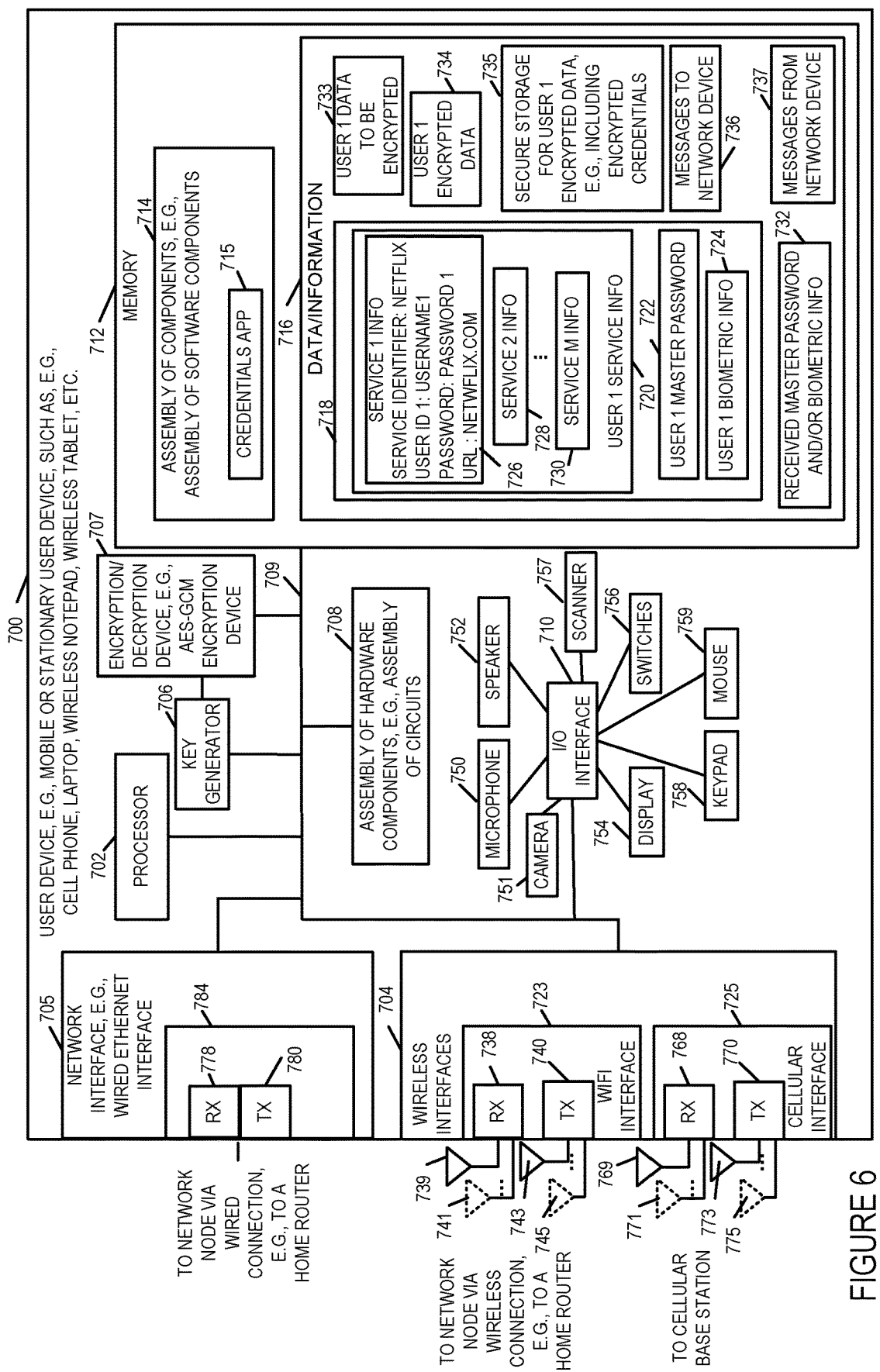
FIG. 6 is a drawing of an exemplary user device, e.g., a cell phone, including securely stored credentials, in accordance with an exemplary embodiment.

FIG. 6 is a drawing of an exemplary user device 700 in accordance with an exemplary embodiment. User device 700 is, e.g., any of user device 120, 121, 130, 140 of FIG. 1, user device 201 of FIG. 2, user device 408 of FIG. 4 or FIG. 5, and/or user device 412 of FIG. 4. User device 700 is, e.g., a mobile or stationary user device, such as, e.g., a cell phone such as a smart phone including a touch screen, a laptop computer, a wireless notepad, a wireless tablet, or a desktop computer.

User device 700 includes a processor 702, e.g. a CPU, a wireless interface 704, a network interface 705, a key generator 706, an encryption/decryption device 707, e.g., an AES-GCM encryption device, e.g., an encryptor/decryptor, an assembly of hardware components 708, e.g., an assembly of circuits, an I/O interface 710, and a memory 712 coupled together via a bus 709 over which the various elements may interchange data and information. Key generator 706 is, e.g. key generator 204 of FIG. 2. Encryption device 707 is, e.g. encryption device 206 of FIG. 2. User device 700 further includes a microphone 750, a camera 751, a speaker 752, a display 754, e.g., a touch screen display, switches 756, a scanner 757, e.g., a fingerprint scanner, a mouse 759, and a keypad 758, coupled to I/O interface 710, via which the various user interface devices may communications with other elements with user device 700. In some embodiments, display 754 is a touch screen display which is a combined input/output device.

Wireless interface 704 includes a WiFi interface 723 and a cellular interface 725. WiFi interface 723 includes a receiver 738 coupled to one or more receive antennas 739, . . . , 741, via which the user device may receive WiFi signals, e.g., from a WiFi router, e.g., a home router at the customer premises corresponding to user device 700. WiFi interface 723 includes a transmitter 740 coupled to one or more transmit antennas 743, . . . , 745, via which the user device may transmit WiFi signals, e.g., to a WiFi router, e.g., a home router at the customer premises corresponding to user device 700.

Cellular interface 725 includes a receiver 768 coupled to one or more receive antennas 769, . . . , 771, via which the user device may receive cellular signals, e.g., from a WiFi router, e.g., a cellular base station. Cellular interface 725 includes a transmitter 770 coupled to one or more transmit antennas 773, . . . , 775, via which the user device may transmit cellular signals, e.g., to a cellular base station.

Network interface 705, e.g., a wired Ethernet interface, includes a receiver 778 and a transmitter 780, via which the user device may receive and transmit signals, respectively, to a network node, e.g. a home router, via a wired connection. In some embodiments, receiver 778 and transmitter 780 are part of a transceiver 784.

Memory 712 includes an assembly of components 714, e.g., an assembly of software components and data/information 716. Assembly of components 714 includes a credentials application (APP) 715. Data/information 716 includes user 1 information 718 including user 1 service information 720, a stored user 1 master password 722, and stored user 1 biometric information 724. User 1 service information 720 includes service information corresponding to one or more services (service 1 information 726, service 2 information 728, . . . , service M information 730). Service I information 726 includes service identifier: Netflix; user ID 1: username 1; password: Password 1; and URL: Netflix.com. Data/information 716 further includes received master password and/or biometric information 732, e.g., to be tested against the stored master password and/or stored biometric information 722, 724, user 1 data to be encrypted 733, user 1 encrypted data 734, secure storage for user 1 encrypted data, e.g., including encrypted credentials including one or more encrypted passwords corresponding to one or more services, generated messages to be sent to the network device 736, and received messages from a network device 737.

Figure 7A:
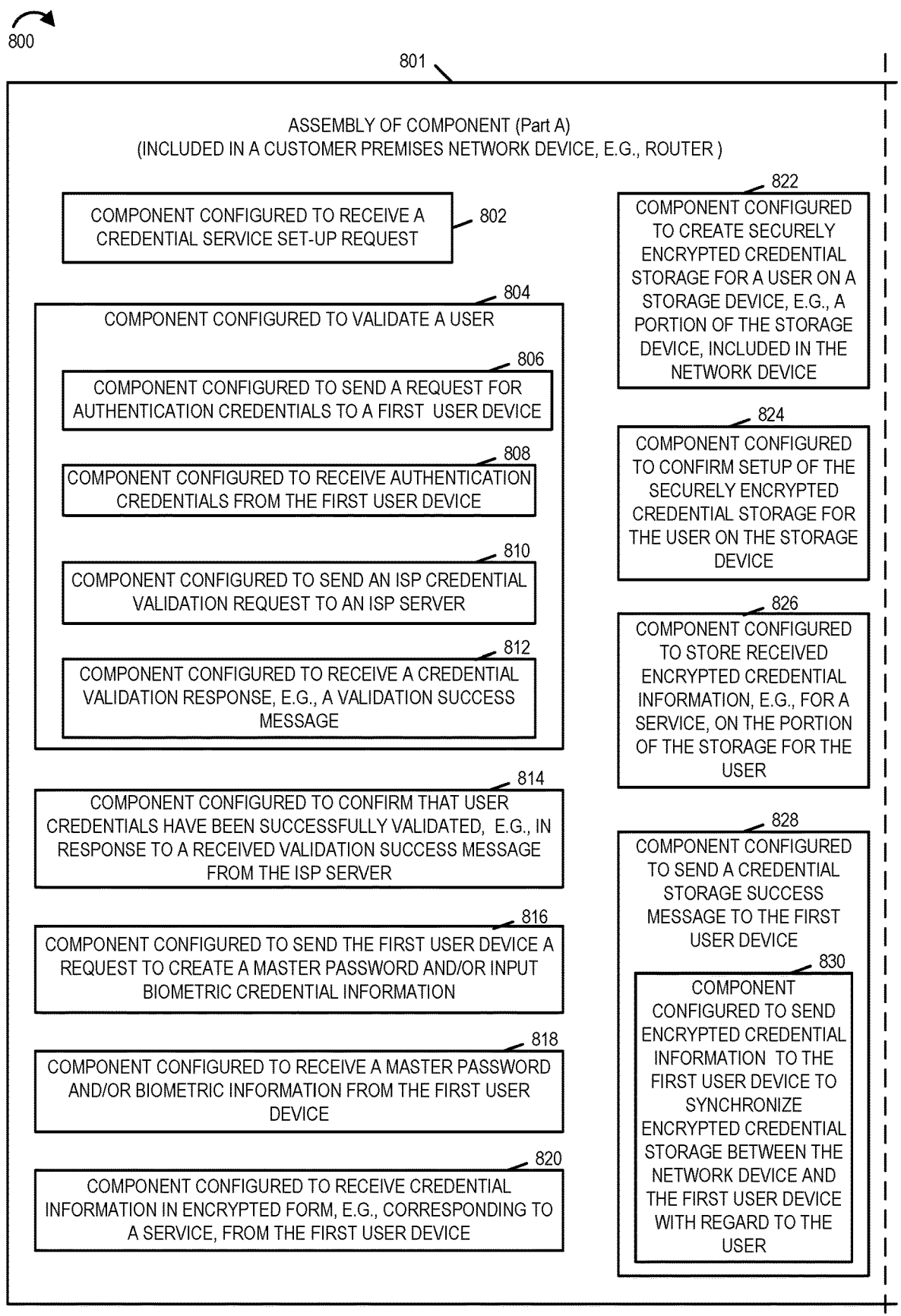
FIG. 7A is a first part of an assembly of components which may be included in a network device, e.g., a customer premises network device such as a wireless router, in accordance with an exemplary embodiment.
Figure 7B:
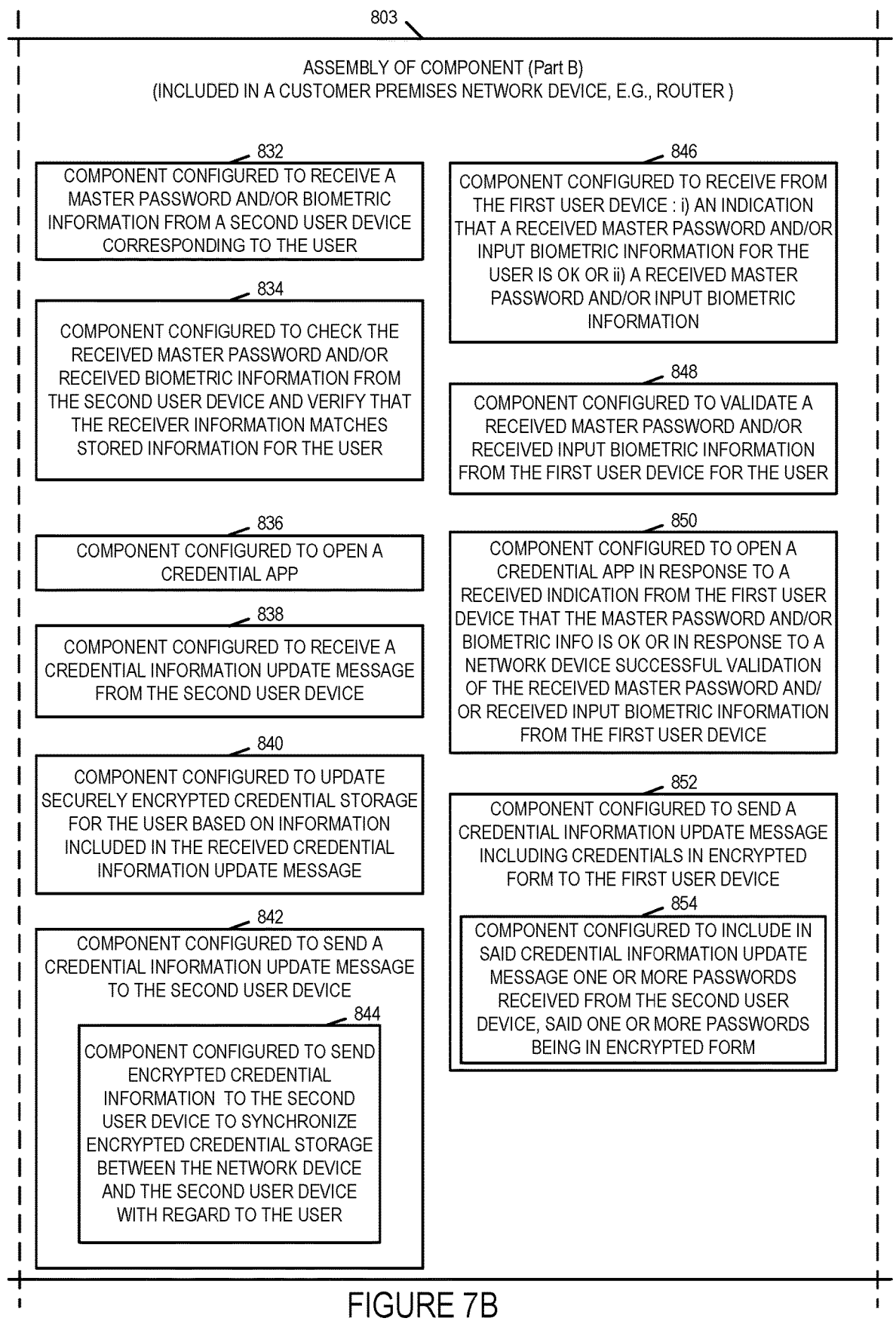
FIG. 7B is a second part of an assembly of components which may be included in a network device, e.g., a customer premises network device such as a wireless router, in accordance with an exemplary embodiment.
Figures 7, 7C:
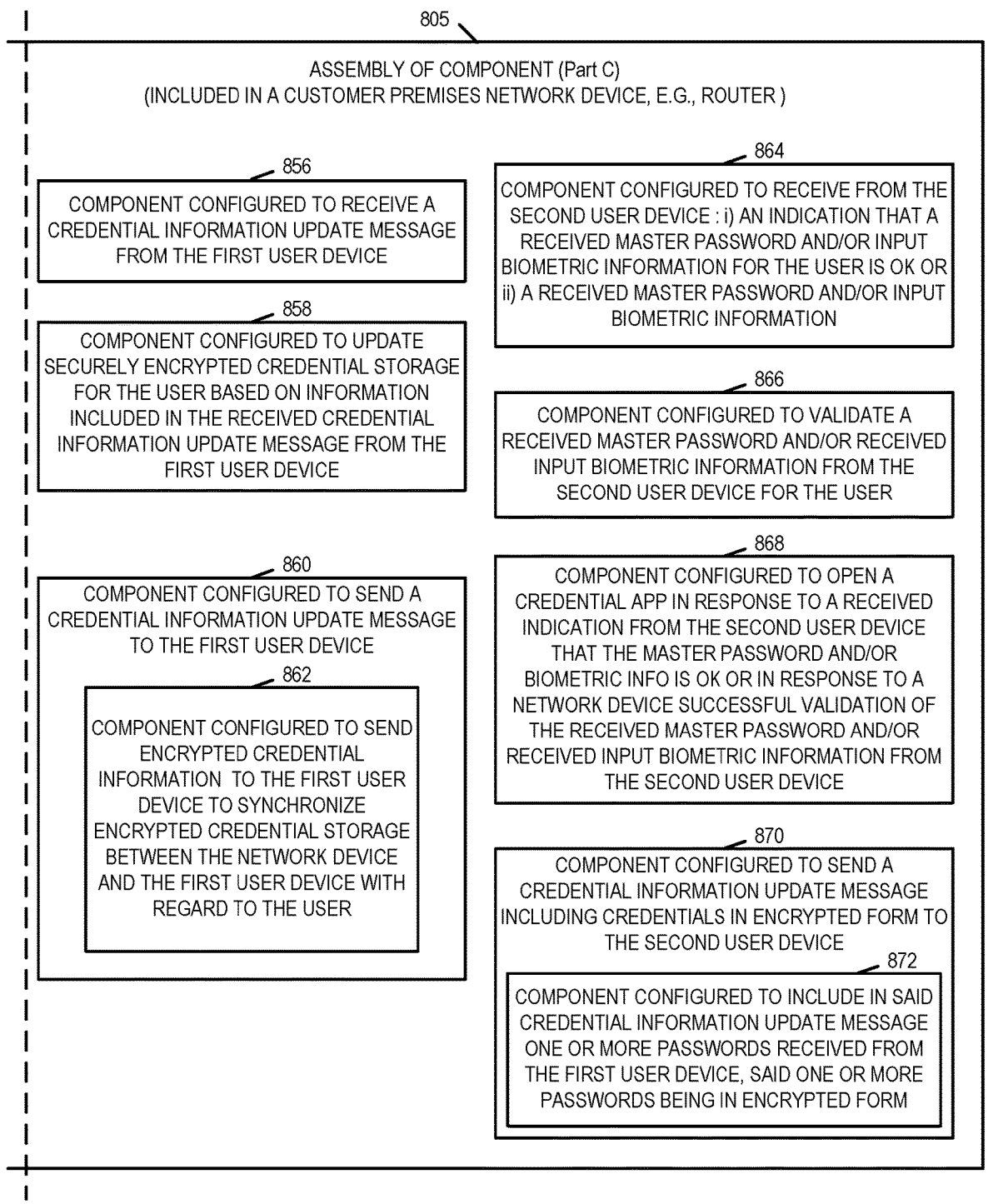
FIG. 7C is a third part of an assembly of components which may be included in a network device, e.g., a customer premises network device such as a wireless router, in accordance with an exemplary embodiment.
FIG. 7 comprises the combination of FIG. 7A, FIG. 7B and FIG. 7C.

FIG. 7, comprising the combination of FIG. 7A, FIG. 7B and FIG. 7C, is a drawing of an assembly of components 800, comprising the combination of Part A 801, Part B 803 and Part C 805, in accordance with an exemplary embodiment. Assembly of components 800 is, e.g., included in a network device, e.g., a customer premises network device such as a home network router, e.g., a home network WiFi router, in accordance with an exemplary embodiment. Exemplary assembly of components 800, may be, and sometimes is, included in a network device, e.g., customer premises network device such as a router, e.g., a home network wireless router, in accordance with an exemplary embodiment. Assembly of components 800 can be, and in some embodiments is, used in customer premises router A 122 of FIG. 1, customer premises router B 132 of FIG. 1, customer premises router C 142 of FIG. 1, home network device, e.g., router 208 of FIG. 2, network device, e.g., router 300 of FIG. 3, and/or customer premises network device 416, e.g., a router, of FIG. 4. The components in the assembly of components 800 can, and in some embodiments are, implemented fully in hardware within the processor 302, e.g., as individual circuits. The components in the assembly of components 800 can, and in some embodiments are, implemented fully in hardware within the assembly of hardware components 303, e.g., as individual circuits corresponding to the different components. In other embodiments some of the components are implemented, e.g., as circuits, within the processor 302 with other components being implemented, e.g., as circuits within assembly of components 303, external to and coupled to the processor 302. As should be appreciated the level of integration of components on the processor and/or with some components being external to the processor may be one of design choice. Alternatively, rather than being implemented as circuits, all or some of the components may be implemented in software and stored in the memory 304 of the network device 300, with the components controlling operation of network device 300 to implement the functions corresponding to the components when the components are executed by a processor, e.g., processor 302. In some such embodiments, the assembly of components 800 is included in the memory 304 as assembly of components 348. In still other embodiments, various components in assembly of components 800 are implemented as a combination of hardware and software, e.g., with another circuit external to the processor providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers.

When implemented in software the components include code, which when executed by the processor 302, configure the processor 302 to implement the function corresponding to the component. In embodiments where the assembly of components 800 is stored in the memory 304, the memory 304 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components, may be used to implement the functions. As should be appreciated, the components illustrated in FIG. 7 control and/or configure the network device 300 or elements therein such as the processor 302, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method, e.g., steps of the method of method and signaling diagram 400 of FIG. 4 and/or described or shown with respect to any of the other figures, e.g., steps which are performed by a network device, e.g., a customer premises network device such as a home network router, e.g., a home network WiFi router. In some embodiments, direct memory access (DMA) 310 and dedicated crypto engine 318 are includes as part of assembly of hardware components 303.

Assembly of components 800 includes a component 802 configured to receive a credential service set-up request, and a component 804 configured to validate a user, e.g., in response to a received credential setup request from a user device, e.g., from a first user device. Component 804 includes a component 806 configured to send a request for authentication credentials, e.g., ISP credentials including a username and a password, a component 808 configured to receive authentication credentials, e.g., an ISP username and corresponding password, from the first user device, a component 810 configured to send an ISP credential validation request to an ISP server, and a component 812 configured to receive a credential validation response, e.g. a validation success message from the ISP server, in response to the ISP credential validation request.

Assembly of components 800 further includes a component 814 configured to confirm the user credentials have been successfully validated, e.g., in response to a received validation success message from the ISP server, a component 816 configured to send the first user device a request to create a master password and/or input biometric credential information, a component 818 configured to receive a master password and/or biometric information from the first user device, a component 820 configured to receive credential information in encrypted form, e.g., corresponding to a service, from the first user device, a component 822 configured to create a securely encrypted credential storage for a user on the storage device, e.g., on a portion of secure storage on the storage device, said storage device being included in the network device.

Assembly of components 800 further includes a component 824 configured to confirm setup of the securely encrypted credential storage for the user on the storage device, a component 826 configured to store received decrypted credential information, e.g., for a service, on the portion of the secure storage for the user, and a component 828 configured to send a credential storage success message to the first user device. Component 828 includes a component 830 configured to send encrypted credential information to the first user device to synchronize encrypted storage between the network device and the first user device with regard to the user.

Assembly of components 800 further includes a component 832 configured to receive a master password and/or biometric information from a second user device corresponding to the user, a component 834 configured to check the received master password and/or received biometric information from the second user device and verify that the received information matches stored information for the user, a component 836 configured to open a credentials app, e.g. in response to the verification of the master password and/or biometric information from the second user device being successful, a component 838 configured to receive a credential information update message from the second user device, e.g., a credential information update message including at least one new or updated password in encrypted form corresponding to a service used by the user, a component 840 configured to update securely encrypted credentials storage for the user based on information included in the received credential information update message, e.g., storing the received changed or additional credential information, e.g., including one or more passwords, in encrypted form, in the portion of the secure memory on the network device allocated to the user for secure credentials storage. Assembly of components 800 further includes a component 842 configured to send a credentials information update message to the second user device, e.g., indicating that the credentials have been successfully stored on the secure memory allocated to the user on the network device. Component 842 includes a component 844 configured to send encrypted credential information to the second user device to synchronize encrypted credential storage between the network device and the second user device with regard to the user.

Assembly of components 800 further includes a component 846 configured to receive from the first user device: i) an indication that a received master password and/or input biometric information for the user is ok or ii) a received master password and/or input biometric information, a component 848 configured to validate a received master password and/or received input biometric information from the first user device for the user, a component 850 configured to open a credentials app in response to a received indication from the first user device that the master password and/or biometric information is ok or in response to a network device successful validation of the received master password and/or received input biometric information from the first user device for the user, and a component 852 configured to send a credentials information update message including credentials in encrypted form to the first user device. Component 852 includes a component 854 configured to include in said credential information update message one or more passwords received from the second user device, said one or more passwords being in encrypted form.

Assembly of components 800 further includes a component 856 configured to receive a credential information update message from the first user device, e.g., a credential information update message including at least one new or updated password in encrypted form corresponding to a service used by the user, a component 858 configured to update securely encrypted credentials storage for the user based on information included in the received credential information update message from the first user device, e.g., storing the received changed or additional credential information, e.g., including one or more passwords, in encrypted form, in the portion of the secure memory on the network device allocated to the user for secure credentials storage. Assembly of components 800 further includes a component 60 configured to send a credentials information update message to the first user device, e.g., indicating that the credentials have been successfully stored on the secure memory allocated to the user on the network device. Component 860 includes a component 862 configured to send encrypted credential information to the first user device to synchronize encrypted credential storage between the network device and the first user device with regard to the user.

Assembly of components 800 further includes a component 864 configured to receive from the second user device:

i) an indication that a received master password and/or input biometric information for the user is ok or ii) a received master password and/or input biometric information, a component 866 configured to validate a received master password and/or received input biometric information from the second user device for the user, a component 868 configured to open a credentials app in response to a received indication from the second user device that the master password and/or biometric information is ok or in response to a network device successful validation of the received master password and/or received input biometric information from the second user device for the user, and a component 870 configured to send a credentials information update message including credentials in encrypted form to the second user device. Component 870 includes a component 872 configured to include in said credential information update message one or more passwords received from the first user device, said one or more passwords being in encrypted form.

Figure 8A:
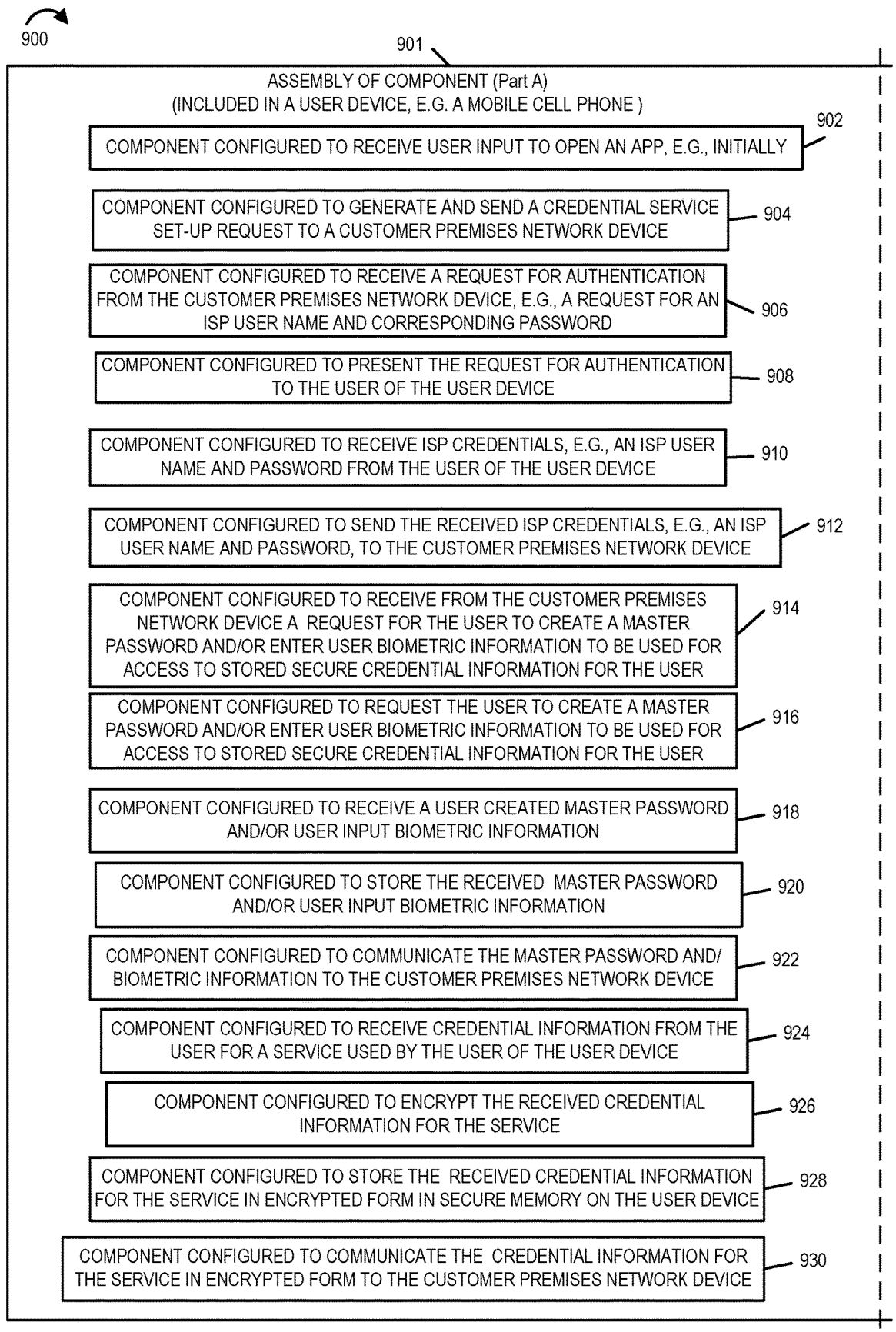
FIG. 8A is a first part of an assembly of components which may be included in a user device, e.g., a mobile smart cell phone, in accordance with an exemplary embodiment.
Figure 8B:
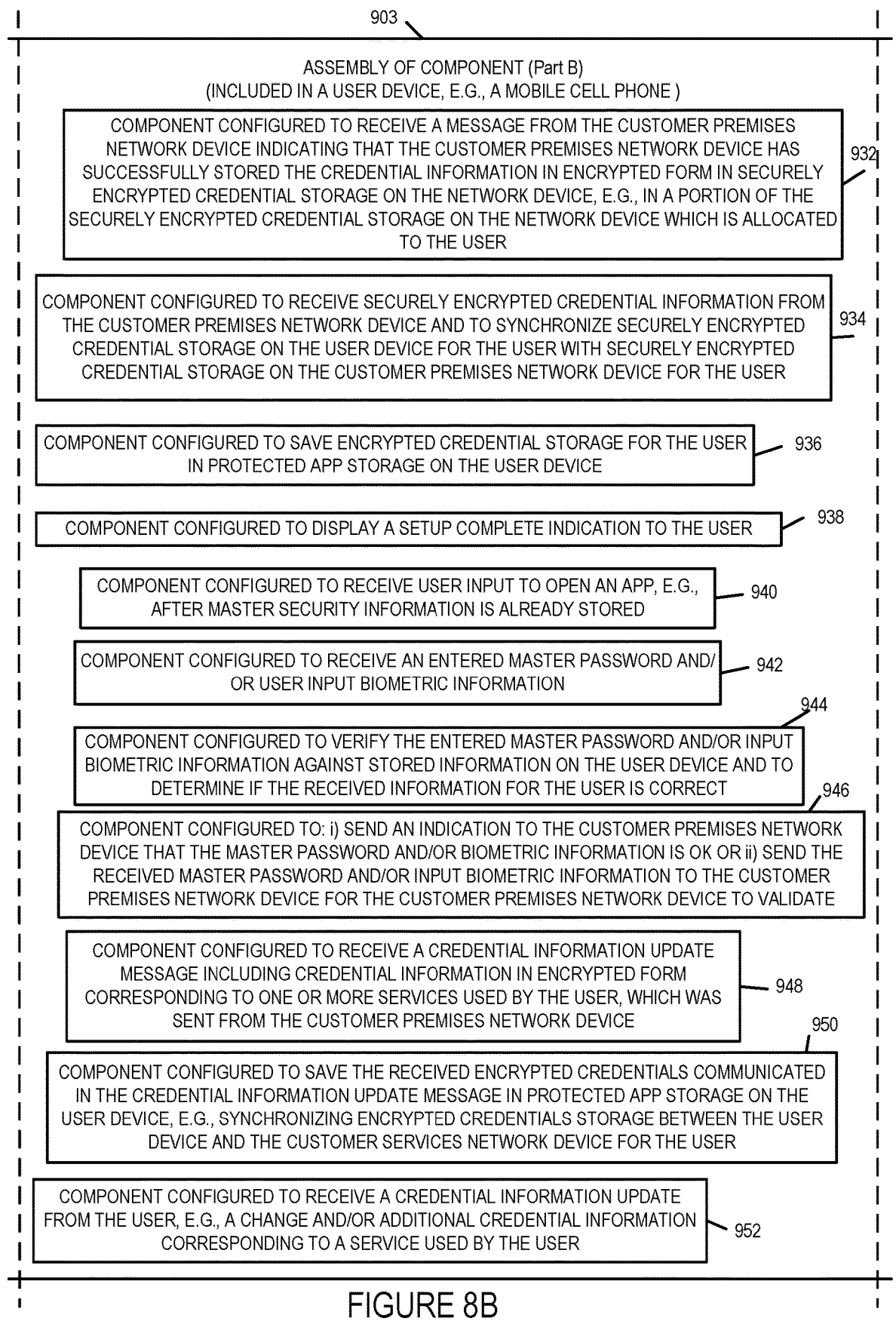
FIG. 8B is a second part of an assembly of components which may be included in a user device, e.g., a mobile smart cell phone, in accordance with an exemplary embodiment.
Figures 8, 8C:
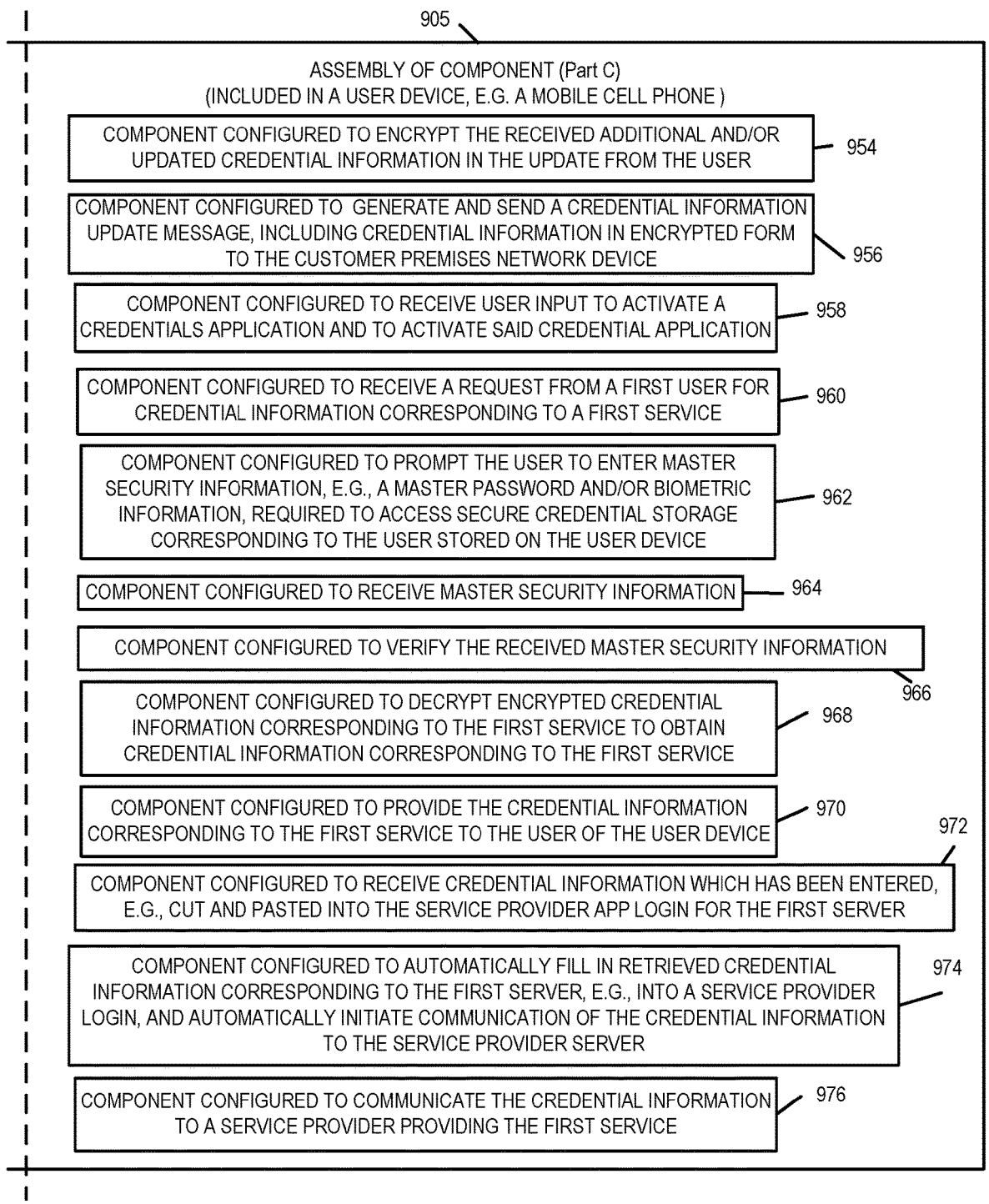
FIG. 8 comprises the combination of FIG. 8A, FIG. 8B and FIG. 8C.

FIG. 8, comprising the combination of FIG. 8A, FIG. 8B and FIG. 8C, is a drawing of an assembly of components 900, comprising the combination of Part A 901, Part B 903 and Part C 905, in accordance with an exemplary embodiment. Assembly of components 900 is, e.g., included in a user device, e.g., a mobile user device such a smart cell phone, wireless tablet, or wireless notebook, in accordance with an exemplary embodiment. Assembly of components 900 can be, and in some embodiments is, used in user device A 120 of FIG. 1, user device B 130 of FIG. 1, user device C 140 of FIG. 1, user device 1 410 of FIG. 4 or FIG. 5, user device 2 412 of FIG. 4 or FIG. 5, and/or user device 700 of FIG. 6. The components in the assembly of components 900 can, and in some embodiments are, implemented fully in hardware within the processor 702, e.g., as individual circuits. The components in the assembly of components 900 can, and in some embodiments are, implemented fully in hardware within the assembly of hardware components 708, e.g., as individual circuits corresponding to the different components. In other embodiments some of the components are implemented, e.g., as circuits, within the processor 702 with other components being implemented, e.g., as circuits within assembly of components 708, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the user device 700, with the components controlling operation of user device 700 to implement the functions corresponding to the components when the components are executed by a processor, e.g., processor 702. In some such embodiments, the assembly of components 900 is included in the memory 712 as assembly of components 714. In still other embodiments, various components in assembly of components 900 are implemented as a combination of hardware and software, e.g., with another circuit external to the processor providing input to the processor 702 which then under software control operates to perform a portion of a component's function. While processor 702 is shown in the FIG. 6 embodiment as a single processor, e.g., computer, it should be appreciated that the processor 702 may be implemented as one or more processors, e.g., computers.

When implemented in software the components include code, which when executed by the processor 702, configure the processor 702 to implement the function corresponding to the component. In embodiments where the assembly of components 900 is stored in the memory 712, the memory 712 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components, may be used to implement the functions. As should be appreciated, the components illustrated in FIG. 6 control and/or configure the user device 700 or elements therein such as the processor 702, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method, e.g., steps of the method of signaling and method diagram 400 of FIG. 4, steps of the method of signaling and method diagram 500 of FIG. 5, and/or described or shown with respect to any of the other figures, e.g., steps which are performed by a user device, e.g., mobile smart cell phone. In some embodiments, key generator 706 and encryption device 707 are includes as part of assembly of hardware components 708.

Assembly of components 900 includes a component 802 configured to receive user input to open an application (app), e.g., initially open a credentials app prior to credentials service set-up operations for the user, a component 904 configured to generate an send a credentials service set-up request to a customer premises network device, e.g., a wireless router, which is physically located at the customer premises which is the home premises for the user device, a component 906 configured to receive a request for authentication from the customer premises network device, e.g., a request for an ISP user name and corresponding password, which will allow the user of the user device to be authenticated by the ISP. Assembly of components 900 further includes a component 908 configured to present the request for authentication to the user of user device, e.g. via the display of the user device, a component 910 configured to receive ISP credentials corresponding to the user of the user device, e.g., an ISP user name and a password from the user of the user device, a component 912 configured to send the received ISP credentials, e.g., an ISP user name and password to the customer premises network device, a component 914 configured to receive from the customer premises network device a request for the user to create a master password and/or enter user biometric information, e.g., a fingerprint scan, a face image, etc., a voice pattern recording, etc., to be used, e.g., in the future, for gaining access to stored secure credential information for the user, a component 916 configured to request the user to create a master password, e.g., via a keypad or a touchscreen display, and/or enter user biometric information, e.g., via a scanner device, a camera included in the user device or a microphone included in the user device, said master password and/or biometric information to be used for access to stored secure credential information and/or for updating stored secure credential information for the user, and a component 918 configured to receive a user created master password and/or user input biometric information and/or information derived and/or characterizing the received user input biometric information. Assembly of components 900 further includes a component 920 configured to store the received master password and/or the user input biometric information, e.g., in encrypted form, on the user device. Assembly of components 900 further includes a component 922 configured to communicate the master password and/or biometric information to the customer premises network device, a component 924 configured to receive credential information from the user for a service, e.g., movie streaming service provider service, used by the user of the user device, a component 926 configured to encrypt the received credential information for the service, a component 928 configured to store the received credential information for the service in encrypted form in the secure memory on the user device, and a component 930 configured to communicate the credential information for the service in encrypted form the customer premises network device 930 while the user device is located at the customer premises of the customer premises network device.

Assembly of components 900 further includes a component 932 configured to receive a message from the customer premises network device indicating that the customer premises network device has successfully stored the credential information in encrypted from in securely encrypted credential storage on the network device, e.g., in a portion of the securely encrypted credential storage on the network device which has been allocated to the user, and a component 934 configured to receive securely encrypted credential information from the customer premises network device and to synchronize securely encrypted credential storage on the user device for the user with securely encrypted credential storage on the customer premises network device for the user. Assembly of components 900 further includes a component 936 configured to save encrypted credential information for the user in protected app storage on the user device, and a component 938 configured to display a setup complete indication to the user, e.g. indicating that the user has created master security information, a secure storage has been established for the user within the customer premises network device, the user has stored some encrypted credentials information corresponding to one or more services which the user uses, and secure storage memory for encrypted service credentials within the customer premises network device and the user device has been synchronized with regard to the user, while the user is at the customer premises of the customer premises network device.

Assembly of components 900 further includes a component 940 configured to receive user input to open an app, e.g., the credentials app, after master security information has already been stored for the user, a component 942 configured to receive an entered master password to be tested and/or user input biometric information to be tested, a component 944 configured to verify that the entered master password and/or user input biometric information against stored information on the user device and to determine if the received information for the user is correct, e.g., the received information matches the stored information. Assembly of components 900 further includes a component 946 configured to: i) send and indication to the customer premises network de vie that the master password and/or the biometric information is ok; or ii) send the received master password and/or input biometric information to the customer premises network device for the customer premises network device to validate, and a component 948 configured to receive a credentials information update message including credential information in encrypted form corresponding to one or more services used by the user, which was sent from the customer premises network device. In some embodiments, the credential information in encrypted form includes one or more new or changed passwords in encrypted form.

In some embodiments, the credential information includes credential information which was preciously communicated to the customer premises network device by another user device, e.g., a second user device of the user, a component 950 configured to save the received encrypted credentials communicated in the credential information update message in protected app storage on the user device, e.g., synchronizing encrypted credentials storage between the user device and the customer premises network device, e.g., home router, with regard to the secure credentials storage for the user, while the user device is located at the customer premises of the customer premises network device, a component 952 configured to receive a credential information update for the user, e.g., a change in existing credentials, e.g., a new password replacing a currently stored password for one service, and/or additional credential information, e.g. a new login username and a new password for a new service to be used by the user, corresponding to one or more services used by the user, a component 954 configured to encrypt the received additional and/or updated credential information in the credentials information update from the user, and a component 956 configured to generate and send a credential information update message, including credentials information in encrypted form, e.g., including one or more new passwords in encrypted form, to the customer premises network device, while the user device is located at the customer premises of the customer premises network device.

Assembly of components 900 further includes a component 958 configured to receive user input to activate a credential application and to activate the credentials information in response to the received input, a component 960 configured to receive a request from a user for credential information corresponding to a first service, e.g. a video content streaming service, a component 962 configured to prompt the user to enter master security information, e.g., a master password and/or biometric information, required to access secure credential storage corresponding to the user stored on the user device, a component 964 configured to receive the master security information, e.g. via one or more input devices of the user device, e.g., keypad, touchscreen, scanner, camera, microphone, etc., a component 966 configured to verify the received master security information, e.g, checking for a match to stored information, a component 968 configured to retrieve and decrypt the encrypted credential information corresponding to the first service to obtain stored credential information in unencrypted form corresponding to the first service, e.g., in response to a determination that the received master security information was satisfactory, a component 970 configured to provide the credential information corresponding to the first service to the user of the first service, a component 972 configured to receive credential information which has been entered, e.g., via user cut and paste operations, into the service provider login for accessing the first service, e.g. via a first service provider server, a component 974 configured to automatically fill in retrieved credential information corresponding to the first server, e.g., into a service provider login, and automatically initiate communication of the credential information to the service provider server, and a component 976 configured to communicate the credential information to a service provider providing the first service.

Numbered List of Exemplary Method Embodiments

Method Embodiment 1 A method, the method comprising: receiving (428) at a customer premises network device (416) physically located at a first customer premises (402), (e.g., router in a home or office) a credential service setup request (426) from a first user device (408, e.g., mobile device such as a cell phone of a first user) while said first user device (408) is physically located at the first customer premises (402) of a first user (406) of the first user device; validating (429) the first user with an ISP provider; sending (464), from the customer premises network device (416), a request (466) for master security information (e.g., a master password or biometric information which will be used to secure credential information corresponding to the first user and control subsequent access to such information) to said first user device (408) requesting information for securing information in first user credential storage included in said network device located at the first customer premises; receiving (490) at the customer premises network device, encrypted information (486) corresponding to the first user (406) sent from the first user device (410), said encrypted information corresponding to the first user including at least one password for a network service; and storing (494) the encrypted information including one or more passwords, in encrypted form, on a portion of a storage device allocated to the first user, said storage device being located in the customer premises network device (416).

Method Embodiment 2 The method of Method Embodiment 1, wherein validating (429) the first user with the ISP provider includes: sending (430) an authentication request (432) (e.g. challenge or request for user credentials such as ISP username and password for logging in with the ISP which can be used to authenticate the first user (406)) to the first user device (408); receiving (448) ISP login credentials (446) from the first user device (408); communicating (450) the ISP login credentials to an ISP server (418) responsible for validating ISP users; and confirming (463) that a validation success result (460) was received from the ISP server (418) in response to the communicated ISP login credentials.

Method Embodiment 3 The method of Method Embodiment 1, further comprising: sending (496), from the first customer premises network device (416), a message (498) to the first user device (408) indicating successful credential storage for the first user.

Method Embodiment 4 The method of Method Embodiment 3, wherein said message (496) to the first user device (408) is sent with credential synchronization information providing the first user device (408) with a copy of at least some encrypted credential information stored on the portion of a storage device included in the customer premises network device (416) allocated to the first user.

Method Embodiment 5 The method of Method Embodiment 4, further comprising: receiving (518) from a second user device (412) corresponding to said first user, while said second user device (412) is located in the first customer premises (402), said master security information corresponding to said first user (406); receiving (530) from the second user device (412) a credential information update (528) including, in encrypted form, at least one new or changed password used by the first user (406) to obtain a service available to the first user (406); and storing (532) the updated credential information on the portion of a storage device included in said customer premises network device (416) allocated to the first user (406).

Method Embodiment 6 The method of Method Embodiment 5, further comprising: sending (534) a credential information update message (536) to the second user device (412) corresponding to the first user (406), while the second user device (412) is at the first customer premises (402), said credential information update message (536) communicating one or more passwords in encrypted form corresponding to the first user (406) for storage in a credential information store on the second user device (412) (e.g., where the update include one or more passwords and service information entered by another device such as the first user device and which were not manually entered into the second user device by the first user).

Method Embodiment 7 The method of Method Embodiment 5, further comprising: receiving (554) from the first user device (408) corresponding to said first user, while first user device is located in the first customer premises (402), said master security information corresponding to said first user; and sending (558) a credential information update message (560) to the first user device (408) corresponding to the first user, while the first user device (408) is at the first customer premises (402), said credential information update message (560) communicating one or more passwords in encrypted form corresponding to the first user for storage in a credential information store on the first user device (408) (e.g., where the update includes one or more passwords and service information entered by another device such as the second user device (412) and which were not manually entered into the first user device (408) by the first user (406)).

Method Embodiment 8 The method of Method Embodiment 7, further comprising: receiving (576) from the first user device (408) a credential information update (574) including, in encrypted form, at least one new or changed password used by the first user to obtain a service available to the first user; and storing (578) the updated credential information on the portion of the storage device included in said customer premises network device allocated to the first user.

Method Embodiment 9 The method of Method Embodiment 1, wherein said first user device is a mobile wireless device.

Method Embodiment 10 The method of Method Embodiment 1, wherein said customer premises network device is a wireless router.

Method Embodiment 11 The method of Method Embodiment 10, wherein said wireless router is a WiFi router.

Method Embodiment 12 The method of Method Embodiment 5, wherein said first user device is a first mobile device and wherein said second user device is a second mobile device.

Method Embodiment 13 The method of Method Embodiment 3, further comprising: operating the first user device (408) to receive (604) a request from the first user (406) for credential information corresponding to a first service (e.g., via screen input selecting the creditable app and user provided information indicating the network service for which credential information is being requested); prompting (606) the first user (e.g., display prompt to enter master security information, e.g., master password or bio-metric information used for authentication to access secure credential storage) to enter master security information required to access secure credential storage corresponding to the first user stored on said first user device (408); receiving (612) at the first user device (408) master security information (e.g., master password entered via a touch screen or biometric information entered via a scanner such as a fingerprint scanner or camera included on the first user device (408)); and verifying (614) the received master security information; and following verification of the received master security information, decrypting (616) the credential information corresponding to the first service; and i) providing (618) the credential information corresponding to the first service to the user of the first device (e.g., display the information to the user so the user can copy it and use it to log into the first service) or ii) communicating (628) the credential information to a server providing the first service (e.g., automatically initiate login to the first service using the stored URL and provide the user identifier and password to automatically login without the need for the user to take additional action such as copying and pasting the password to complete a login operation).

Method Embodiment 14 The method of Method Embodiment 1, wherein said customer premises network device (416) is a wireless access point with network connectivity to the ISP server (418); wherein said first user device (408) is a cell phone; and wherein said encrypted information including one or more passwords stored on the portion of the storage device allocated to the first user includes at least a first identifier (e.g. URL) of a first video streaming service (e.g., Netflix), a first user identifier (e.g., Netflix user ID of the first user) used to identify the first user to the first video streaming service; and a password used by the first user with the first video streaming service.

Numbered List of Exemplary System Embodiments

System Embodiment 1 A system (100) comprising: a customer premises network device (416) (e.g., a router) physically located at a first customer premises (402), said customer premises network device (416) including: a first receiver (332); a first transmitter (334); a processor (302); and a storage device (304); and wherein said first receiver (332) is configured to receive (428) at a customer premises network device (416) physically located at a first customer premises (402), (e.g., router in a home or office) a credential service setup request (426) from a first user device (408, e.g., mobile device such as a cell phone of a first user) while said first user device (408) is physically located at the first customer premises (402) of a first user (406) of the first user device; wherein said processor (302) is configured to validate (429) the first user with an ISP provider; wherein said processor (302) is configured to control the first transmitter to send (464), from the customer premises network device (416), a request (466) for master security information (e.g., a master password or biometric information which will be used to secure credential information corresponding to the first user and control subsequent access to such information) to said first user device (408) requesting information for securing information in first user credential storage included in said network device located at the first customer premises; wherein said first receiver (332) is further configured to receive (490) at the customer premises network device, encrypted information (486) corresponding to the first user (406) sent from the first user device (410), said encrypted information corresponding to the first user including at least one password for a network service; and wherein said processor (302) is further configured to store (494) the encrypted information including one or more passwords, in encrypted form, on a portion of said storage device allocated to the first user, said storage device.

System Embodiment 2 The system (100) of System Embodiment 1, wherein said customer premises network device (416) further includes: a second transmitter (330); and a second receiver (328); and wherein said processor (302) is configured to: control the first transmitter (344) to send (430) an authentication request (432) (e.g. challenge or request for user credentials such as ISP username and password for logging in with the ISP which can be used to authenticate the first user (406)) to the first user device (408); control the first receiver (332) to receive (448) ISP login credentials (446) from the first user device (408); control the second transmitter (330) to communicate (450) the ISP login credentials to an ISP server (418) responsible for validating ISP users; and confirm (463) that a validation success result (460) was received from the ISP server (418) in response to the communicated ISP login credentials, as part of being configured to validate (429) the first user with the ISP provider.

System Embodiment 3 The system (100) of System Embodiment 1, wherein said processor is further configured to: control said first transmitter to send (496), from the first customer premises network device (416), a message (498) to the first user device (408) indicating successful credential storage for the first user.

System Embodiment 4 The system (100) of System Embodiment 3, wherein said message (496) to the first user device (408) is sent with credential synchronization information providing the first user device (408) with a copy of at least some encrypted credential information stored on the portion of a storage device (304) included in the customer premises network device (416) allocated to the first user.

System Embodiment 5 The system of System Embodiment 4, wherein said first receiver (332) is further configured to: receive (518) from a second user device (412) corresponding to said first user, while said second user device (412) is located in the first customer premises (402), said master security information corresponding to said first user (406); receive (530) from the second user device (412) a credential information update (528) including, in encrypted form, at least one new or changed password used by the first user (406) to obtain a service available to the first user (406); and wherein said processor (302) is further configured to: store (532) the updated credential information on the portion of said storage device included in said customer premises network device (416) allocated to the first user (406).

System Embodiment 6 The system (100) of System Embodiment 5, wherein said processor (302) is further configured to: control said first transmitter (334) to send (534) a credential information update message (536) to the second user device (412) corresponding to the first user (406), while the second user device (412) is at the first customer premises (402), said credential information update message (536) communicating one or more passwords in encrypted form corresponding to the first user (406) for storage in a credential information store on the second user device (412) (e.g., where the update include one or more passwords and service information entered by another device such as the first user device and which were not manually entered into the second user device by the first user).

System Embodiment 7 The system (100) of System Embodiment 5, wherein said first receiver (332) is further configured to: receive (554) from the first user device (408) corresponding to said first user, while first user device is located in the first customer premises (402), said master security information corresponding to said first user; and wherein said processor (302) is further configured to control said first transmitter (334) to send (558) a credential information update message (560) to the first user device (408) corresponding to the first user, while the first user device (408) is at the first customer premises (402), said credential information update message (560) communicating one or more passwords in encrypted form corresponding to the first user for storage in a credential information store on the first user device (408) (e.g., where the update includes one or more passwords and service information entered by another device such as the second user device (412) and which were not manually entered into the first user device (408) by the first user (406)).

System Embodiment 8 The system (100) of System Embodiment 7, wherein said first receiver (332) is further configured to receive (576) from the first user device (408) a credential information update (574) including, in encrypted form, at least one new or changed password used by the first user to obtain a service available to the first user; and wherein said processor (302) is further configured to store (578) the updated credential information on the portion of the storage device (304) included in said customer premises network device allocated to the first user.

System Embodiment 9 The system (100) of System Embodiment 1, wherein said first user device (408) is a mobile wireless device.

System Embodiment 10 The system (100) of System Embodiment 1, wherein said customer premises network device (416) is a wireless router.

System Embodiment 11 The system (100) of System Embodiment 10, wherein said wireless router (416) is a WiFi router.

System Embodiment 12 The system (100) of System Embodiment 5, wherein said first user device (408) is a first mobile device and wherein said second user device (412) is a second mobile device.

System Embodiment 13 The system (100) of System Embodiment 3, further comprising: said first user device (408), said first user device (408) including: a second processor (702); a user device receiver (738); and at least one of: i) an output device (754); an input device (758, 757, 751, 754, 759, and/or 750); or iii) a combined input/output device (754); and wherein said second processor (702) is configured to: operate the first user device (408) to receive (604) a request from the first user (406) for credential information corresponding to a first service (e.g., via screen input selecting the creditable app and user provided information indicating the network service for which credential information is being requested); operate the first user device to prompt (606), via the output device (754) or the combined input/output device (754), the first user (e.g., display prompt to enter master security information, e.g., master password or bio-metric information used for authentication to access secure credential storage) to enter master security information required to access secure credential storage corresponding to the first user stored on said first user device (408); operate the first user device to receive (612), via said input device (758, 757, 751, 754, 759, and/or 750) or the combined input/output device (754), at the first user device (408) master security information (e.g., master password entered via a touch screen or biometric information entered via a scanner such as a fingerprint scanner or camera included on the first user device (408)); and verify (614) the received master security information; and following verification of the received master security information, decrypt (616) the credential information corresponding to the first service; and i) provide (618), via the output device (754) or the combined input/output device (754), the credential information corresponding to the first service to the user of the first device (e.g., display the information to the user so the user can copy it and use it to log into the first service) or ii) operate the first user device (408) to communicate (628) the credential information to a server (419) providing the first service (e.g., automatically initiate login to the first service using the stored URL and provide the user identifier and password to automatically login without the need for the user to take additional action such as copying and pasting the password to complete a login operation).

System Embodiment 14 The system (100) of System Embodiment 1, wherein said customer premises network device (416) is a wireless access point with network connectivity to the ISP server (418); wherein said first user device (408) is a cell phone; and wherein said encrypted information including one or more passwords stored on the portion of the storage device allocated to the first user includes at least a first identifier (e.g. URL) of a first video streaming service (e.g., Netflix), a first user identifier (e.g., Netflix user ID of the first user) used to identify the first user to the first video streaming service; and a password used by the first user with the first video streaming service.

First Numbered List of Exemplary Apparatus Embodiments

Apparatus Embodiment 1 A customer premises network device (416) (e.g., a router) physically located at a first customer premises (402), said customer premises network device (416) comprising: a first receiver (332); a first transmitter (334); a processor (302); and a storage device (304); and wherein said first receiver (332) is configured to receive (428) at a customer premises network device (416) physically located at a first customer premises (402), (e.g., router in a home or office) a credential service setup request (426) from a first user device (408, e.g., mobile device such as a cell phone of a first user) while said first user device (408) is physically located at the first customer premises (402) of a first user (406) of the first user device; wherein said processor (302) is configured to validate (429) the first user with an ISP provider; wherein said processor (302) is configured to control the first transmitter to send (464), from the customer premises network device (416), a request (466) for master security information (e.g., a master password or biometric information which will be used to secure credential information corresponding to the first user and control subsequent access to such information) to said first user device (408) requesting information for securing information in first user credential storage included in said network device located at the first customer premises; wherein said first receiver (332) is further configured to receive (490) at the customer premises network device, encrypted information (486) corresponding to the first user (406) sent from the first user device (410), said encrypted information corresponding to the first user including at least one password for a network service; and wherein said processor (302) is further configured to store (494) the encrypted information including one or more passwords, in encrypted form, on a portion of said storage device allocated to the first user, said storage device.

Apparatus Embodiment 2 The customer premises network device (416) of Apparatus Embodiment 1, wherein said customer premises network device (416) further includes: a second transmitter (330); and a second receiver (328); and wherein said processor (302) is configured to: control the first transmitter (344) to send (430) an authentication request (432) (e.g. challenge or request for user credentials such as ISP username and password for logging in with the ISP which can be used to authenticate the first user (406)) to the first user device (408); control the first receiver (332) to receive (448) ISP login credentials (446) from the first user device (408); control the second transmitter (330) to communicate (450) the ISP login credentials to an ISP server (418) responsible for validating ISP users; and confirm (463) that a validation success result (460) was received from the ISP server (418) in response to the communicated ISP login credentials, as part of being configured to validate (429) the first user with the ISP provider.

Apparatus Embodiment 3 The customer premises network device (416) of Apparatus Embodiment 1, wherein said processor is further configured to: control said first transmitter to send (496), from the first customer premises network device (416), a message (498) to the first user device (408) indicating successful credential storage for the first user.

Apparatus Embodiment 4 The customer premises network device (416) of Apparatus Embodiment 3, wherein said message (496) to the first user device (408) is sent with credential synchronization information providing the first user device (408) with a copy of at least some encrypted credential information stored on the portion of a storage device (304) included in the customer premises network device (416) allocated to the first user.

Apparatus Embodiment 5 The customer premises network device (416) of Apparatus Embodiment 4, wherein said first receiver (332) is further configured to: receive (518) from a second user device (412) corresponding to said first user, while said second user device (412) is located in the first customer premises (402), said master security information corresponding to said first user (406); receive (530) from the second user device (412) a credential information update (528) including, in encrypted form, at least one new or changed password used by the first user (406) to obtain a service available to the first user (406); and wherein said processor (302) is further configured to: store (532) the updated credential information on the portion of said storage device included in said customer premises network device (416) allocated to the first user (406).

Apparatus Embodiment 6 The customer premises network device (416) of Apparatus Embodiment 5, wherein said processor (302) is further configured to: control said first transmitter (334) to send (534) a credential information update message (536) to the second user device (412) corresponding to the first user (406), while the second user device (412) is at the first customer premises (402), said credential information update message (536) communicating one or more passwords in encrypted form corresponding to the first user (406) for storage in a credential information store on the second user device (412) (e.g., where the update include one or more passwords and service information entered by another device such as the first user device and which were not manually entered into the second user device by the first user).

Apparatus Embodiment 7 The customer premises network device (416) of Apparatus Embodiment 5, wherein said first receiver (332) is further configured to: receive (554) from the first user device (408) corresponding to said first user, while first user device is located in the first customer premises (402), said master security information corresponding to said first user; and wherein said processor (302) is further configured to control said first transmitter (334) to send (558) a credential information update message (560) to the first user device (408) corresponding to the first user, while the first user device (408) is at the first customer premises (402), said credential information update message (560) communicating one or more passwords in encrypted form corresponding to the first user for storage in a credential information store on the first user device (408) (e.g., where the update includes one or more passwords and service information entered by another device such as the second user device (412) and which were not manually entered into the first user device (408) by the first user (406)).

Apparatus Embodiment 8 The customer premises network device (416) of Apparatus Embodiment 7, wherein said first receiver (332) is further configured to receive (576) from the first user device (408) a credential information update (574) including, in encrypted form, at least one new or changed password used by the first user to obtain a service available to the first user; and wherein said processor (302) is further configured to store (578) the updated credential information on the portion of the storage device (304) included in said customer premises network device allocated to the first user.

Apparatus Embodiment 9 The customer premises network device (416) of Apparatus Embodiment 1, wherein said first user device (408) is a mobile wireless device.

Apparatus Embodiment 10 The customer premises network device (416) of Apparatus Embodiment 1, wherein said customer premises network device (416) is a wireless router.

Apparatus Embodiment 11 The customer premises network device (416) of Apparatus Embodiment 10, wherein said wireless router (416) is a WiFi router.

Apparatus Embodiment 12 The customer premises network device (416) of Apparatus Embodiment 5, wherein said first user device (408) is a first mobile device and wherein said second user device (412) is a second mobile device.

Apparatus Embodiment 13 The customer premises network device (416) of Apparatus Embodiment 1, wherein said customer premises network device (416) is a wireless access point with network connectivity to the ISP server (418); wherein said first user device (408) is a cell phone; and wherein said encrypted information including one or more passwords stored on the portion of the storage device allocated to the first user includes at least a first identifier (e.g. URL) of a first video streaming service (e.g., Netflix), a first user identifier (e.g., Netflix user ID of the first user) used to identify the first user to the first video streaming service; and a password used by the first user with the first video streaming service.

Second Numbered List of Exemplary Apparatus Embodiments

Apparatus Embodiment 1 A first user device (408) comprising: a processor (702); a user device receiver (738); and at least one of: an output device (754); an input device (758, 757, 751, 754, 759, and/or 750); or a combined input/output device (754); and wherein said processor (702) is configured to: operate the first user device (408) to receive (604) a request from the first user (406) for credential information corresponding to a first service (e.g., via screen input selecting the creditable app and user provided information indicating the network service for which credential information is being requested); operate the first user device to prompt (606), via the output device (754) or the combined input/output device (754), the first user (e.g., display prompt to enter master security information, e.g., master password or bio-metric information used for authentication to access secure credential storage) to enter master security information required to access secure credential storage corresponding to the first user stored on said first user device (408); operate the first user device to receive (612), via said input device (758, 757, 751, 754, 759, and/or 750) or the combined input/output device (754), at the first user device (408)

master security information (e.g., master password entered via a touch screen or biometric information entered via a scanner such as a fingerprint scanner or camera included on the first user device (408)); and verify (614) the received master security information; and following verification of the received master security information, decrypt (616) the credential information corresponding to the first service; and i) provide (618), via the output device (754) or the combined input/output device (754), the credential information corresponding to the first service to the user of the first device (e.g., display the information to the user so the user can copy it and use it to log into the first service) or ii) operate the first user device (408) to communicate (628) the credential information to a server (419) providing the first service (e.g., automatically initiate login to the first service using the stored URL and provide the user identifier and password to automatically login without the need for the user to take additional action such as copying and pasting the password to complete a login operation).

Apparatus Embodiment 2 The first user device (408) of Apparatus Embodiment 1, wherein said first user device is a mobile wireless device.

Apparatus Embodiment 3 The first user device (408) of Apparatus embodiment 1, wherein said processor is further configured to synchronize securely stored credential information, in encrypted format, corresponding to the first user, which is stored within secure memory of the first user device with securely stored credential information, in encrypted format, corresponding to the first user, which is stored within a customer premises network device, while said first user device is located at the customer premises in which the customer premises network device is located.

Apparatus Embodiment 4 The first user device (408) of Apparatus Embodiment 3, wherein said customer premises network device is a router.

Apparatus Embodiments 5 The first user device (408) of Apparatus Embodiment 4, wherein said router is a home network wireless router, and wherein said home network wireless router is the home network router for the first user device.

Apparatus Embodiment 6 The first user device (408) of Apparatus Embodiment 5, wherein said first user device is one of a plurality of user devices (408, 412) which may be used by the first user.

Apparatus Embodiment 7 The first user device (408) of Apparatus embodiment 6, wherein said processor is further configured to synchronize its securely stored credential information with a second user device used by the first user.

Apparatus Embodiment 8 The first user device (408) of Apparatus embodiments 7, wherein synchronization of first user device (408) securely stored credential information corresponding to the first user and second user device (412) securely stored credential information corresponding to the first user is via a portion of securely stored memory on the customer premises network device allocated to the first user.

First Numbered List of Exemplary Non-Transitory

Computer Readable Medium Embodiments

Non-transitory computer readable medium embodiment 1 A non-transitory computer readable medium (304) including processor executable instructions which when executed by a processor (300) of a customer premises network device (300) control the customer premises network device (300) to: receive (428) at the customer premises network device (416) physically located at a first customer premises (402), (e.g., router in a home or office) a credential service setup request (426) from a first user device (408, e.g., mobile device such as a cell phone of a first user) while said first user device (408) is physically located at the first customer premises (402) of a first user (406) of the first user device; validate (429) the first user with an ISP provider; send (464), from the customer premises network device (416), a request (466) for master security information (e.g., a master password or biometric information which will be used to secure credential information corresponding to the first user and control subsequent access to such information) to said first user device (408) requesting information for securing information in first user credential storage included in said network device located at the first customer premises; receive (490) at the customer premises network device, encrypted information (486) corresponding to the first user (406) sent from the first user device (410), said encrypted information corresponding to the first user including at least one password for a network service; and store (494) the encrypted information including one or more passwords, in encrypted form, on a portion of a storage device allocated to the first user, said storage device being located in the customer premises network device (416).

Second Numbered List of Exemplary Non-Transitory

Computer Readable Medium Embodiments

Non-transitory computer readable medium embodiment 1 A non-transitory computer readable medium (712) including processor executable instructions which when executed by a processor (700) of a first user device (700) control the first user device (700) to: receive (604) a request from the first user (406) for credential information corresponding to a first service (e.g., via screen input selecting the creditable app and user provided information indicating the network service for which credential information is being requested); prompt (606) the first user (e.g., display prompt to enter master security information, e.g., master password or biometric information used for authentication to access secure credential storage) to enter master security information required to access secure credential storage corresponding to the first user stored on said first user device (408); receive (612) at the first user device (408) master security information (e.g., master password entered via a touch screen or biometric information entered via a scanner such as a fingerprint scanner or camera included on the first user device (408)); and verify (614) the received master security information; and following verification of the received master security information, decrypting (616) the credential information corresponding to the first service; and i) provide (618) the credential information corresponding to the first service to the user of the first device (e.g., display the information to the user so the user can copy it and use it to log into the first service) or ii) communicate (628) the credential information to a server providing the first service (e.g., automatically initiate login to the first service using the stored URL and provide the user identifier and password to automatically login without the need for the user to take additional action such as copying and pasting the password to complete a login operation).

The techniques of various embodiments may be implemented using software, hardware and/or a combination of software and hardware. Various embodiments are directed to apparatus, e.g., user devices, e.g., cell phones, CPE user devices, customer premises network devices, e.g., routers, e.g., WiFi routers, service provider servers, ISP servers, etc. Various embodiments are also directed to methods, e.g., method of controlling and/or operating user devices, CPE devices, customer premises network devices, e.g. routers, ISP servers, service provider servers, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, servers, nodes and/or elements described herein are implemented using one or more components to perform the steps corresponding to one or more methods, for example, message reception, encryption, decryption, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, routers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as user devices, customer premises network device, e.g., router, and servers, are configured to perform the steps of the methods described as being performed by the user device, customer premises network device, e.g., router, server. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., user device, customer premises network device, e.g., router, server, with a processor which includes a component corresponding to each of the steps of the various described methods performed by the device in which the processor is included. In some but not all embodiments a device, e.g., e.g., user device, customer premises network device, e.g., router, server, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a device, e.g., user device, customer premises network device, e.g., router, server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a e.g., user device, customer premises network device, e.g., router, server, or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method, the method comprising:
receiving at a customer premises network device physically located at a first customer premises, a credential service setup request from a first user device while said first user device is physically located at the first customer premises of a first user of the first user device;
validating the first user with an ISP provider;
sending, from the customer premises network device, a request for master security information to said first user device requesting information for securing information in first user credential storage included in said network device located at the first customer premises;
receiving at the customer premises network device, encrypted information corresponding to the first user sent from the first user device, said encrypted information corresponding to the first user including at least one password for a network service;
storing the encrypted information including one or more passwords, in encrypted form, on a portion of a storage device allocated to the first user, said storage device being located in the customer premises network device;

sending, from the first customer premises network device, a message to the first user device indicating successful credential storage for the first user;

operating the first user device to receive a request from the first user for credential information corresponding to a first service;

prompting the first user to enter master security information required to access secure credential storage corresponding to the first user stored on said first user device;

receiving at the first user device master security information; and verifying the received master security information; and following verification of the received master security information, decrypting the credential information corresponding to the first service; and i) providing the credential information corresponding to the first service to the user of the first device or ii) communicating the credential information to a server providing the first service.

2. The method of claim 1, wherein validating the first user with the ISP provider includes:

sending an authentication request to the first user device;

receiving ISP login credentials from the first user device;

communicating the ISP login credentials to an ISP server responsible for validating ISP users; and confirming that a validation success result was received from the ISP server in response to the communicated ISP login credentials.

3. The method of claim 1, wherein said message to the first user device is sent with credential synchronization information providing the first user device with a copy of at least some encrypted credential information stored on the portion of a storage device included in the customer premises network device allocated to the first user.

4. The method of claim 1, wherein said customer premises network device is a wireless access point with network connectivity to the ISP server;

wherein said first user device is a cell phone; and wherein said encrypted information including one or more passwords stored on the portion of the storage device allocated to the first user includes at least a first identifier of a first video streaming service, a first user identifier used to identify the first user to the first video streaming service, and a password used by the first user with the first video streaming service.

5. A method, the method comprising:

receiving at a customer premises network device physically located at a first customer premises, a credential service setup request from a first user device while said first user device is physically located at the first customer premises of a first user of the first user device;

validating the first user with an ISP provider;

sending, from the customer premises network device, a request for master security information to said first user device requesting information for securing information in first user credential storage included in said network device located at the first customer premises;

receiving at the customer premises network device, encrypted information corresponding to the first user sent from the first user device, said encrypted information corresponding to the first user including at least one password for a network service;

storing the encrypted information including one or more passwords, in encrypted form, on a portion of a storage device allocated to the first user, said storage device being located in the customer premises network device;

sending, from the first customer premises network device, a message to the first user device indicating successful credential storage for the first user, wherein said message to the first user device is sent with credential synchronization information providing the first user device with a copy of at least some encrypted credential information stored on the portion of a storage device included in the customer premises network device allocated to the first user;

receiving from a second user device corresponding to said first user, while said second user device is located in the first customer premises, said master security information corresponding to said first user;

receiving from the second user device a credential information update including, in encrypted form, at least one new or changed password used by the first user to obtain a service available to the first user; and storing the updated credential information on the portion of a storage device included in said customer premises network device allocated to the first user.

6. The method of claim 5, further comprising:

sending a credential information update message to the second user device corresponding to the first user, while the second user device is at the first customer premises, said credential information update message communicating one or more passwords in encrypted form corresponding to the first user for storage in a credential information store on the second user device.

7. The method of claim 5, further comprising:

receiving from the first user device corresponding to said first user, while first user device is located in the first customer premises, said master security information corresponding to said first user; and sending a credential information update message to the first user device corresponding to the first user, while the first user device is at the first customer premises, said credential information update message communicating one or more passwords in encrypted form corresponding to the first user for storage in a credential information store on the first user device.

8. The method of claim 7, further comprising:

receiving from the first user device a credential information update including, in encrypted form, at least one new or changed password used by the first user to obtain a service available to the first user; and storing the updated credential information on the portion of the storage device included in said customer premises network device allocated to the first user.

9. A system comprising:

a customer premises network device physically located at a first customer premises, said customer premises network device including:

a first receiver;

a first transmitter;

a processor; and a storage device; and wherein said first receiver is configured to receive at the customer premises network device physically located at the first customer premises, a credential service setup request from a first user device while said first user device is physically located at the first customer premises of a first user of the first user device;

wherein said processor is configured to validate the first user with an ISP provider;

39 wherein said processor is configured to control the first transmitter to send, from the customer premises network device, a request for master security information to said first user device requesting information for securing information in first user credential storage included in said network device located at the first customer premises;

wherein said first receiver is further configured to receive at the customer premises network device, encrypted information corresponding to the first user sent from the first user device, said encrypted information corresponding to the first user including at least one password for a network service; and wherein said processor is further configured to store the encrypted information including one or more passwords, in encrypted form, on a portion of said storage device allocated to the first user; and wherein said processor is further configured to: control said first transmitter to send, from the first customer premises network device, a message to the first user device indicating successful credential storage for the first user; and wherein the system further comprises:

said first user device, said first user device including:
 a second processor;
 a user device receiver; and at least one of:
  i) an output device;
  ii) an input device; or
  iii) a combined input/output device; and wherein said second processor is configured to:
 operating the first user device to receive a request from the first user for credential information corresponding to a first service;
 operate the first user device to prompt, via the output device or the combined input/output device, the first user to enter master security information required to access secure credential storage corresponding to the first user stored on said first user device;
 operate the first user device to receive, via said input device or the combined input/output device, at the first user device master security information; and
 verify the received master security information; and
 following verification of the received master security information,
  decrypt the credential information corresponding to the first service; and
  i) provide, via the output device or the combined input/output device, the credential information corresponding to the first service to the user of the first device or
  ii) operate the first user device to communicate the credential information to a server providing the first service.

10. The system of claim 9,
wherein said customer premises network device further includes:
 a second transmitter; and
 a second receiver; and wherein said processor is configured to:
 control the first transmitter to send an authentication request to the first user device;
 control the first receiver to receive ISP login credentials from the first user device;
 control the second transmitter to communicate the ISP login credentials to an ISP server responsible for validating ISP users; and

40 confirm that a validation success result was received from the ISP server in response to the communicated ISP login credentials,
as part of being configured to validate the first user with the ISP provider.

11. The system of claim 9, wherein said message to the first user device is sent with credential synchronization information providing the first user device with a copy of at least some encrypted credential information stored on the portion of a storage device included in the customer premises network device allocated to the first user.

12. The system of claim 9,
wherein said customer premises network device is a wireless access point with network connectivity to the ISP server;
wherein said first user device is a cell phone; and
wherein said encrypted information including one or more passwords stored on the portion of the storage device allocated to the first user includes at least a first identifier of a first video streaming service, a first user identifier used to identify the first user to the first video streaming service, and a password used by the first user with the first video streaming service.

13. A system comprising:
a customer premises network device physically located at a first customer premises, said customer premises network device including:
 a first receiver;
 a first transmitter;
 a processor; and
 a storage device; and wherein said first receiver is configured to receive at a customer premises network device physically located at a first customer premises, a credential service setup request from a first user device while said first user device is physically located at the first customer premises of a first user of the first user device;

wherein said processor is configured to validate the first user with an ISP provider;

wherein said processor is configured to control the first transmitter to send, from the customer premises network device, a request for master security information to said first user device requesting information for securing information in first user credential storage included in said network device located at the first customer premises;

wherein said first receiver is further configured to receive at the customer premises network device, encrypted information corresponding to the first user sent from the first user device, said encrypted information corresponding to the first user including at least one password for a network service; and wherein said processor is further configured to store the encrypted information including one or more passwords, in encrypted form, on a portion of said storage device allocated to the first user;

wherein said processor is further configured to:
control said first transmitter to send, from the first customer premises network device, a message to the first user device indicating successful credential storage for the first user, wherein said message to the first user device is sent with credential synchronization information providing the first user device with a copy of at least some encrypted credential information stored on the portion of a storage device included in the customer premises network device allocated to the first user;

wherein said first receiver is further configured to:
receive from a second user device corresponding to said first user, while said second user device is located in the first customer premises, said master security information corresponding to said first user;
receive from the second user device a credential information update including, in encrypted form, at least one new or changed password used by the first user to obtain a service available to the first user; and
wherein said processor is further configured to:
store the updated credential information on the portion of said storage device included in said customer premises network device allocated to the first user.

14. The system of claim 13, wherein said processor is further configured to:
control said first transmitter to send a credential information update message to the second user device corresponding to the first user, while the second user device is at the first customer premises, said credential information update message communicating one or more passwords in encrypted form corresponding to the first user for storage in a credential information store on the second user device.

15. The system of claim 13, wherein said first receiver is further configured to:
receive from the first user device corresponding to said first user, while first user device is located in the first customer premises, said master security information corresponding to said first user; and
wherein said processor is further configured to control said first transmitter to send a credential information update message to the first user device corresponding to the first user, while the first user device is at the first customer premises, said credential information update message communicating one or more passwords in encrypted form corresponding to the first user for storage in a credential information store on the first user device.

16. A non-transitory computer readable medium including processor executable instructions which when executed by a processor of a customer premises network device control the customer premises network device to:
receive at the customer premises network device physically located at a first customer premises, a credential service setup request from a first user device while said first user device is physically located at the first customer premises of a first user of the first user device;
validate the first user with an ISP provider;
send, from the customer premises network device, a request for master security information to said first user device requesting information for securing information in first user credential storage included in said network device located at the first customer premises;
receive at the customer premises network device, encrypted information corresponding to the first user sent from the first user device, said encrypted information corresponding to the first user including at least one password for a network service;
store the encrypted information including one or more passwords, in encrypted form, on a portion of a storage device allocated to the first user, said storage device being located in the customer premises network device;
send, from the first customer premises network device, a message to the first user device indicating successful credential storage for the first user, wherein said message to the first user device is sent with credential synchronization information providing the first user device with a copy of at least some encrypted credential information stored on the portion of a storage device included in the customer premises network device allocated to the first user;
receive from a second user device corresponding to said first user, while said second user device is located in the first customer premises, said master security information corresponding to said first user;
receive from the second user device a credential information update including, in encrypted form, at least one new or changed password used by the first user to obtain a service available to the first user; and
store the updated credential information on the portion of a storage device included in said customer premises network device allocated to the first user.

\* \* \* \* \*